US012263454B2

(12) United States Patent
Lund

(10) Patent No.: US 12,263,454 B2
(45) Date of Patent: Apr. 1, 2025

(54) STATIC MIXER INSERTS AND STATIC MIXERS INCORPORATING SAME

(71) Applicant: William J. Lund, Seaside, OR (US)

(72) Inventor: William J. Lund, Seaside, OR (US)

( * ) Notice: Subject to any disclaimer, the term of this patent is extended or adjusted under 35 U.S.C. 154(b) by 631 days.

(21) Appl. No.: 17/702,524

(22) Filed: Mar. 23, 2022

(65) Prior Publication Data

US 2022/0323918 A1 Oct. 13, 2022

Related U.S. Application Data

(63) Continuation of application No. 17/227,567, filed on Apr. 12, 2021, now Pat. No. 11,285,448.

(51) Int. Cl.
*B01F 25/434* (2022.01)
*B01F 25/441* (2022.01)
*B01F 25/431* (2022.01)

(52) U.S. Cl.
CPC ........ *B01F 25/4341* (2022.01); *B01F 25/434* (2022.01); *B01F 25/4342* (2022.01); *B01F 25/4413* (2022.01); *B01F 25/431* (2022.01); *B01F 25/4412* (2022.01)

(58) Field of Classification Search
CPC . B01F 25/434; B01F 25/4341; B01F 25/4413
See application file for complete search history.

(56) References Cited

U.S. PATENT DOCUMENTS

| | | | | |
|---|---|---|---|---|
| 3,286,992 A * | 11/1966 | Armeniades | B01F 25/43141 | 261/DIG. 26 |
| 4,034,964 A * | 7/1977 | Larson | B01F 25/434 | 366/338 |
| 5,437,819 A * | 8/1995 | Hardison | F28C 3/06 | 261/112.2 |
| 5,758,967 A * | 6/1998 | King | B22D 17/00 | 366/337 |
| 7,887,764 B2 * | 2/2011 | Jernberg | B01F 35/55 | 366/279 |
| 10,744,481 B2 * | 8/2020 | Tikhonov | B01J 19/30 | |
| 2002/0063344 A1 * | 5/2002 | Pagade | B01F 25/4323 | 261/DIG. 72 |

* cited by examiner

*Primary Examiner* — Marc C Howell
(74) *Attorney, Agent, or Firm* — Parsons & Goltry, PLLC; Michael W. Goltry; Robert A. Parsons

(57) ABSTRACT

A static mixer for liquids or gases includes a housing having a continuous inner surface defining a fluid flow path for liquids or gases, an inlet to the fluid flow path, and an outlet from the fluid flow path, and an insert extending longitudinally through the fluid flow path between the inlet and the outlet. The insert is elastically expansive to exert outwardly directed pressure against the continuous inner surface of the housing. In one embodiment, the insert is hollow and has deflectors dispersed therethroughout and each projecting inwardly into the fluid flow path. In another embodiment, the insert includes a helical deflector extending inwardly into the fluid flow path from the continuous inner surface, and helically about a longitudinal axis of the housing.

8 Claims, 17 Drawing Sheets

STATIC MIXER INSERTS AND STATIC MIXERS INCORPORATING SAME

FIELD OF THE INVENTION

This invention relates to static mixers.

BACKGROUND OF THE INVENTION

A static mixer is a precision-engineered device without moving components for the continuous mixing of fluids. While the fluids are typically liquid, static mixers are also useful for mixing gas streams, gases and liquids, and immiscible liquids. The energy for mixing develops from a loss in pressure as fluids flow through the static mixer. There are two main static mixer designs, namely, the plate-type design and the housed-elements design. Of significance is the housed-elements design.

A housed-elements static mixer includes mixer elements in a tube or housing of metal or plastic. The mixer elements include non-moving baffles of metal or plastic, which continuously blend fluid components delivered through the housing. The mixer elements are precision engineered, notoriously expensive, and either welded in place to the housing or mechanically secured in place with separate hold-down devices, such as fasteners, brackets, or collars. Accordingly, known designs of housed-elements static mixers are expensive, require specialized skill to manufacture and assemble, and are not readily serviceable. Given these and other deficiencies, the need for continued improvement in the art is evident.

SUMMARY OF THE INVENTION

According to the invention, a static mixer for liquids or gases includes a housing and a hollow insert. The housing includes a continuous inner surface defining a fluid flow path for liquids or gases, an inlet to the fluid flow path, and an outlet from the fluid flow path. The hollow insert extends longitudinally through the fluid flow path between the inlet and the outlet, is elastically expansive to exert outwardly directed pressure against the continuous inner surface, and has deflectors dispersed therethroughout. Each deflector projects inwardly into the fluid flow path. More specifically, each deflector projects angularly upward toward the inlet. The hollow insert is formed unitarily with the deflectors. Each deflector is bent inwardly into the fluid flow path from an opening therefor through the hollow insert. The deflectors are coextensive in a particular embodiment. In another embodiment, there is at least one hole through each deflector.

According to the invention, a static mixer for liquids or gases includes a housing and a hollow insert. The housing includes a continuous inner surface defining a fluid flow path for liquids or gases, an inlet to the fluid flow path, and an outlet from the fluid flow path. The hollow insert extends longitudinally through the fluid flow path between the inlet and the outlet, is severed longitudinally and elastically expansive to exert outwardly directed pressure against the continuous inner surface, and has deflectors dispersed therethroughout. Each deflector projects inwardly into the fluid flow path. More specifically, each deflector projects angularly upward toward the inlet. The hollow insert is formed unitarily with the deflectors. Each deflector is bent inwardly into the fluid flow path from an opening therefor through the hollow insert. The deflectors are coextensive in a particular embodiment. In another embodiment, there is at least one hole through each deflector.

According to the invention, a static mixer for liquids or gases includes a housing and a hollow insert. The housing includes a continuous inner surface defining a fluid flow path for liquids or gases, an inlet to the fluid flow path, and an outlet from the fluid flow path. The hollow insert extends longitudinally through the fluid flow path between the inlet and the outlet and has an intake end open to the inlet, a discharge end open to the outlet, a length from the intake end to the discharge end, and deflectors dispersed therethroughout. The hollow insert is severed longitudinally from the intake end to the discharge end and is elastically expansive to exert outwardly directed pressure against the continuous inner surface. Each deflector projects inwardly into the fluid flow path. In a particular embodiment, each deflector projects angularly upward toward the inlet. The hollow insert is formed unitarily with the deflectors. Each deflector is bent inwardly into the fluid flow path from an opening therefor through the hollow insert. The deflectors are coextensive in a particular embodiment. In another embodiment, there is at least one hole through each deflector.

According to the invention, a static mixer for liquids or gases includes a housing including a continuous inner surface defining a fluid flow path for liquids or gases, an inlet to the fluid flow path, and an outlet from the fluid flow path. An annular sidewall extends longitudinally through the fluid flow path between the inlet and the outlet, and includes an outer surface in frictional engagement with the continuous inner surface of the housing, an inner surface, and deflectors dispersed therethroughout and each projecting inwardly into the fluid flow path from the inner surface. Each deflector projects inwardly into the fluid flow path. More specifically, each deflector projects angularly upward toward the inlet. The annular sidewall is formed unitarily with the deflectors. Each deflector is bent inwardly into the fluid flow path from an opening therefor through the annular sidewall. The deflectors are coextensive in a particular embodiment. In another embodiment, there is at least one hole through each deflector.

According to the invention, a static mixer for liquids or gases includes a housing and a helical member. The housing is arranged about a longitudinal axis and includes a continuous inner surface defining a fluid flow path for liquids or gases, an inlet to the fluid flow path, and an outlet from the fluid flow path. The helical member extends longitudinally through the fluid flow path and helically about the longitudinal axis between the inlet and the outlet. The helical member is elastically expansive to exert outwardly directed pressure against the continuous inner surface and has deflectors dispersed therethroughout and each projecting inwardly into the fluid flow path. In a particular embodiment, each deflector projects angularly upward toward the inlet. The helical member is formed unitarily with the deflectors. Each deflector is bent inwardly into the fluid flow path from an opening therefor through the helical member. The deflectors are coextensive in a particular embodiment. The deflectors are equally spaced apart helically between respective ends of the helical member.

According to the invention, a static mixer for liquids or gases includes a housing and a helical deflector. The housing is arranged about a longitudinal axis and includes a continuous inner surface defining a fluid flow path for liquids or gases, an inlet to the fluid flow path, and an outlet from the fluid flow path. The helical deflector extends longitudinally through the fluid flow path between the inlet and the outlet, inwardly into the fluid flow path from the continuous inner surface, and helically about the longitudinal axis. The helical deflector is elastically expansive to exert outwardly directed pressure against the continuous inner surface. Openings extend through the deflector and are equally spaced apart helically in a preferred embodiment.

According to the invention, a static mixer for liquids or gases includes a housing and an insert. The housing is arranged about a longitudinal axis and includes a continuous inner surface defining a fluid flow path for liquids or gases, an inlet to the fluid flow path, and an outlet from the fluid flow path. The insert includes a helical member extending longitudinally through the fluid flow path and helically about the longitudinal axis between the inlet and the outlet. The helical member is elastically expansive to exert outwardly directed pressure against the continuous inner surface. The helical member has a helical deflector extending longitudinally through the fluid flow path between the inlet and the outlet, inwardly into the fluid flow path from the helical member, and helically about the longitudinal axis. The insert includes an intake end open to the inlet, and a discharge end open to the outlet. The helical member and the helical deflector concurrently extend from the intake end to the discharge end. Openings extend through the deflector and are equally spaced apart helically in a preferred embodiment.

BRIEF DESCRIPTION OF THE DRAWINGS

Specific objects and advantages of the invention will become apparent to those skilled in the art from the following detailed description of illustrative embodiments thereof, taken in conjunction with the drawings in which.

DETAILED DESCRIPTION

Static mixer inserts and static mixers formed therewith are disclosed.

Figures 1, 2, 3, 4, 5:
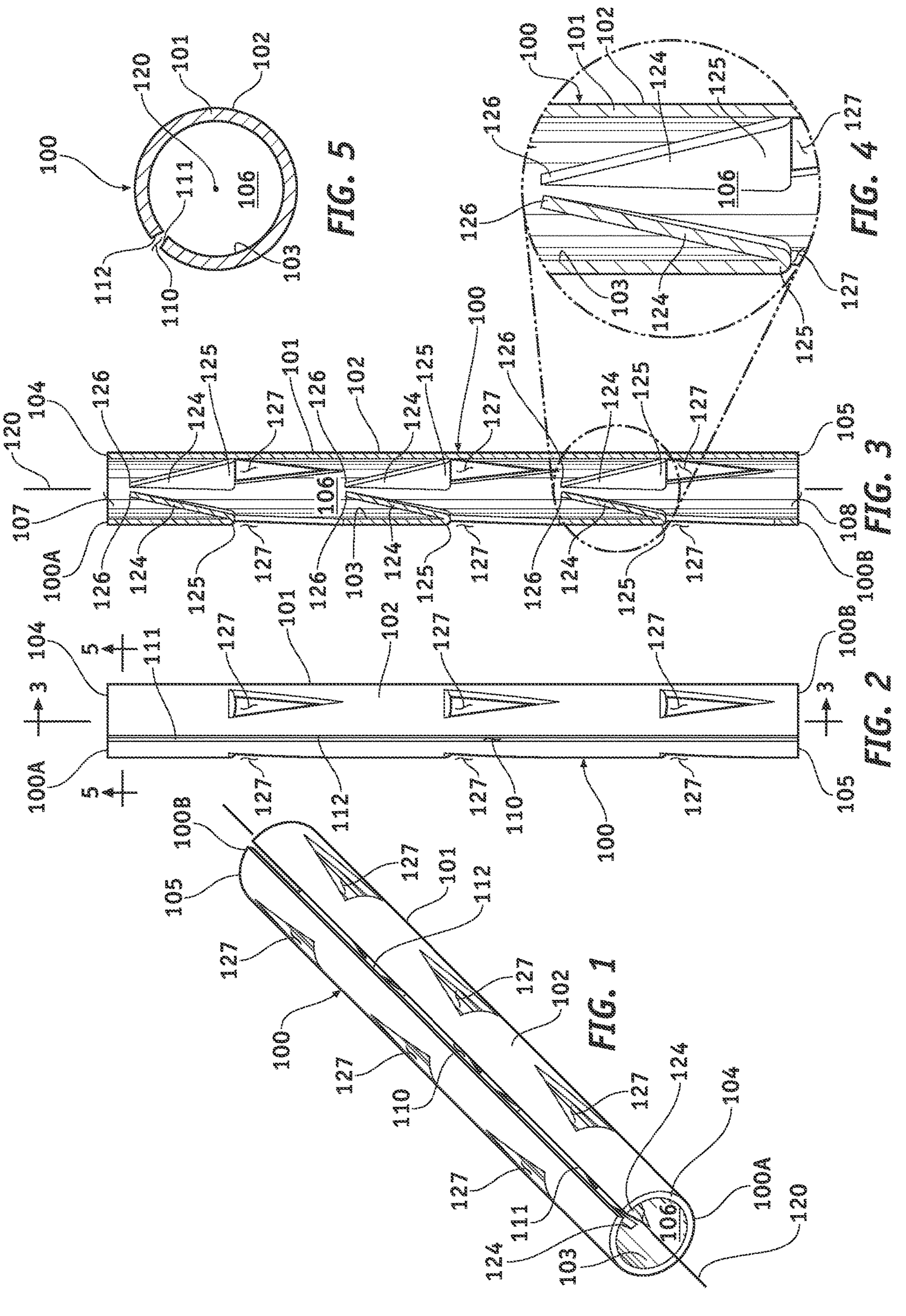
FIG. 1 is a perspective view of static mixer insert according to the invention.
FIG. 2 is a side elevation view of the embodiment of FIG. 1.
FIG. 3 is a section view taken along line 3-3 of FIG. 2.
FIG. 4 is an enlarged view of a circled area of FIG. 3.
FIG. 5 is a section view taken along line 5-5 of FIG. 3.
Figure 6:
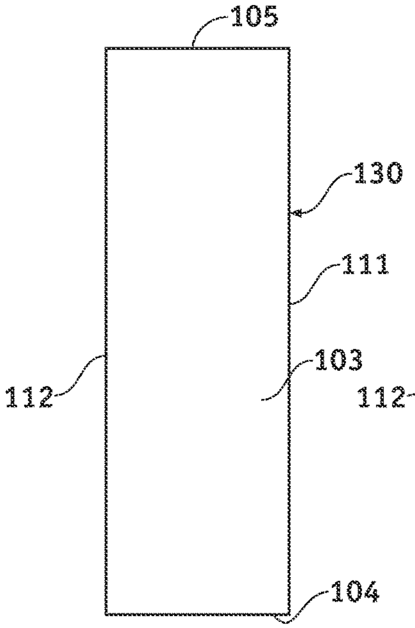
FIG. 6 is a front elevation view of a sheet of material from which the static mixer insert of FIG. 1 is formed.
Figure 7:
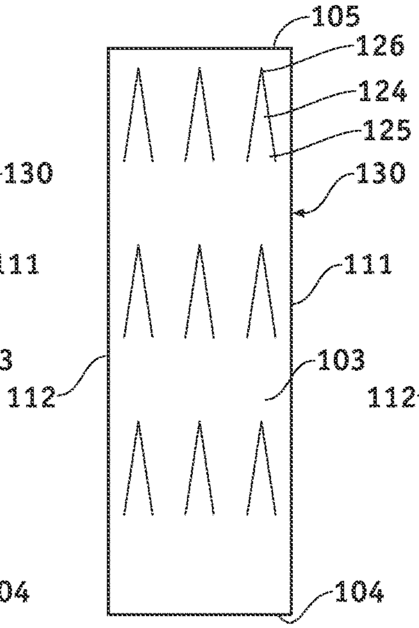
FIG. 7 is view corresponding to FIG. 6 illustrating deflectors cut into the sheet.
Figure 8:
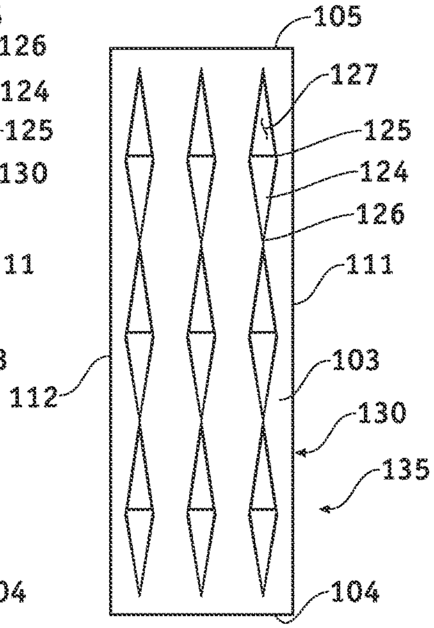
FIG. 8 is a view corresponding to FIG. 7 illustrating each deflector bent outwardly from the sheet from an opening therefor through the sheet to form a static mixer insert segment that when roll formed forms the static mixer insert of FIG. 1.
Figure 9:
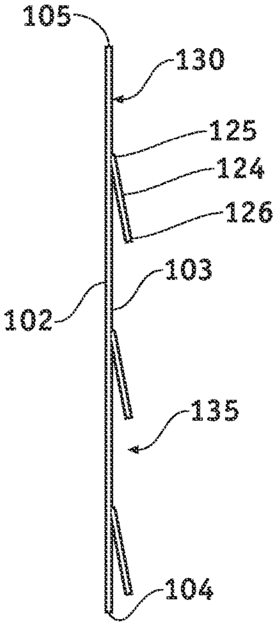
FIG. 9 is a side elevation view of the embodiment of FIG. 8, the opposite side elevation view being the same thereof.
Figure 10:
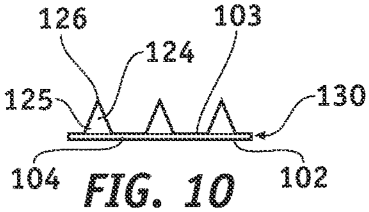
FIG. 10 is an end elevation view of the embodiment of FIG. 8.
Figure 11:
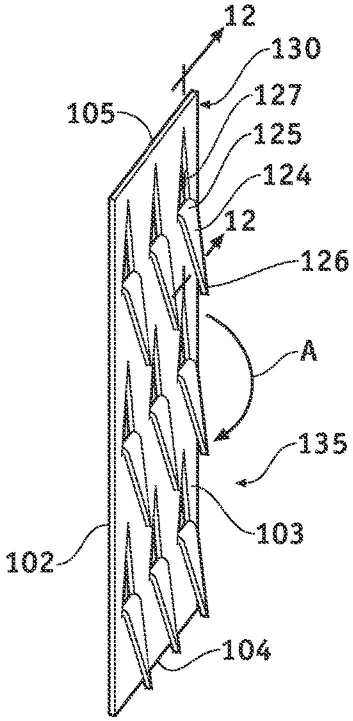
FIG. 11 is a perspective view of the embodiment of FIG. 8.
Figure 12:
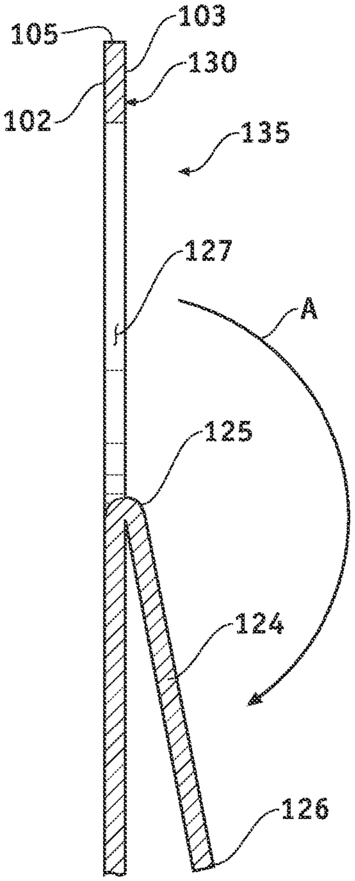
FIG. 12 is a section view taken along line 12-12 of FIG. 11.

Turning now to the drawings in which like reference characters indicate corresponding elements, attention is first directed to FIGS. 1-3 illustrating a static mixer insert 100 configured for insertion into a housing to form a static mixer for mixing fluid streams applied through the housing, whether gas streams, fluid streams, or fluid and gas streams. Insert 100 is an elongate, hollow, tubular form including elongate annular sidewall 101 having outer surface 102, inner surface 103, and opposed annular end edges 104 and 105. Inner surface 103 defines volume 106 for the passage of fluid streams extending from opening 107 encircled by end edge 104 at an intake end of insert 100 denoted generally at 100A to opening 108 encircled by end edge 105 at a discharge end of insert denoted generally at 100B. Opening 107 for the intake of fluid streams at intake end 100A of insert 100 and opening 108 for the discharge of mixed fluid streams at discharge end 100B of insert 100 are aligned axially at either end of insert 100 and are each open to volume 106 extending longitudinally therebetween. End gap 110 longitudinally severs annular sidewall 101 along its length from end edge 104 to end edge 105 to define spaced-apart, parallel side edges 111 and 112 extending longitudinally from end edge 104 to end edge 105. Annular sidewall 101, and thus insert 100, is arranged about axis 120 in FIGS. 1, 3, and 5 extending centrally through volume 106 from opening 107 to opening 108 in FIG. 3. Annular sidewall 101 is generally cylindrical in this example and is tensionable, being fabricated of plastic, a malleable metal, such as ductile iron, or steel, a cellulosic composition, or other like or similar material or combination of materials.

Insert 100 has an array of fluid deflectors 124 dispersed therethroughout in FIG. 3. Deflectors 124, non-moving fluid mixing elements of insert 100, are arranged in a predetermined pattern along the length of insert 100 between intake end 100A and discharge end 100B. Deflectors 124 are arranged longitudinally between intake and discharge ends 100A and 100B, and circumferentially between side edges 111 and 112. Each deflector 124 is flat and extends from a base or inner end 125 connected to annular sidewall 101 to a free or outer end 126. Each deflector 124 projects inwardly into volume 106 from inner surface 103 and angularly upward relative to inner surface 103 toward opening 107 of intake end 100A from base 125 to free end 126 just inboard of or otherwise without reaching axis 120 about which annular sidewall 101 is arranged. Annular sidewall 101 is formed unitarily with deflectors 124, each being of the same material as annular sidewall 101, in which base 125 of each deflector 124 is integral with annular sidewall 101. In this exemplary embodiment, each deflector 124 is cut into annular sidewall 101 and bent at its base 125 inwardly into volume 106 from inner surface 103 and out from an opening 127 therefor or otherwise from whence it was cut extending through annular sidewall 101 from outer surface 102 to inner surface 103. Deflectors 124 in the present embodiment are coextensive and are each and its respective opening 127 generally triangular in shape, each deflector 124 tapering outwardly from its base 125 at inner surface 103 to its pointed free end 126.

Insert 100 has a length from end edge 104 at intake end 100B to end edge 105 at discharge end 100B and has a standard or general length suitable for cutting to a correct length, or a preselected length corresponding to a specific application. Referring in relevant part to FIGS. 6-12, insert 100 is suitably fabricated from a flat, elongate sheet 130 of material in FIG. 6 having surface 102, surface 103 in FIGS. 9, 10, and 12, end edges 104 and 105, and side edges 111 and 112 extending from end edge 104 to end edge 105. End edges 104 and 105 are parallel to one another as are side edges 111 and 112 and are perpendicular relative to side edges 111 and 112. Sheet 130 is flat and rectangular, in which end edges 104 and 105 are equal in length as are side edges 111 and 112 and substantially shorter than side edges 111 and 112. Deflectors 124 are each cut into sheet 130 in FIG. 7 with a die cutter, a stamping press, a laser or plasma cutter, a waterjet cutter, or other suitable technique. Each deflector 124 formed in sheet 130 extends toward end edge 105 from base 125 thereof left integral with sheet 130 to its corresponding free end 126. Deflectors 124 are each bent at base 125 outwardly from surface 103 from the resulting opening 127 therefor through sheet 130 in the direction of arcuate arrow A in FIGS. 11 and 12 so as to point or otherwise project angularly upward relative to surface 103 toward end edge 104 from base 125 to free end 126 to form a static mixer insert segment 135 in FIGS. 8, 9, 10 and 11. Each deflector 124 is bent by hand or with the use of a suitable bending tool. Insert 100 is formed simply by roll-forming segment 135, namely, by rolling sheet 130 inwardly toward inner surface 103 to close side edges 111 and 112 on either side of the resulting end gap 100 to form the resulting hollow, tubular insert 100 in FIG. 1 enclosing deflectors 124 in the resulting volume 106 extending longitudinally between openings 107 and 108 of the formed intake and discharge ends 100A and 100B, respectively. Segment 135 is roll-formed by hand or with suitable roll-forming equipment. Deflectors 124 are bent to their angular orientation as described so that when segment 135 is roll-formed into insert 100 the free ends 126 fall short of reaching axis 120. This prevents deflectors 124 from becoming entangled and contacting or otherwise interfering with one another in the formed insert 100 to become bent or deflected out of position.

The non-moving deflectors 124 of segment 135 are dispersed throughout sheet 130 between end edges 104 and 105 and side edges 111 and 112 in a predetermined number and pattern suitable for mixing fluid components. By way of example, the array of deflectors 124 of segment 135 includes nine deflectors 124 arranged in three parallel rows of three equally spaced-apart deflectors 124. The rows are parallel to end edges 104 and 105, perpendicular to side edges 111 and 112, and equally spaced apart vertically between end edges 104 and 105. This arrangement and number of deflectors 124 and their previously described triangular shapes are illustrated only by example. The skilled person will readily appreciate that deflectors 124 of insert 100 can have any shape, size, varying size, arrangement, and number without departing from this disclosure.

Figure 13:
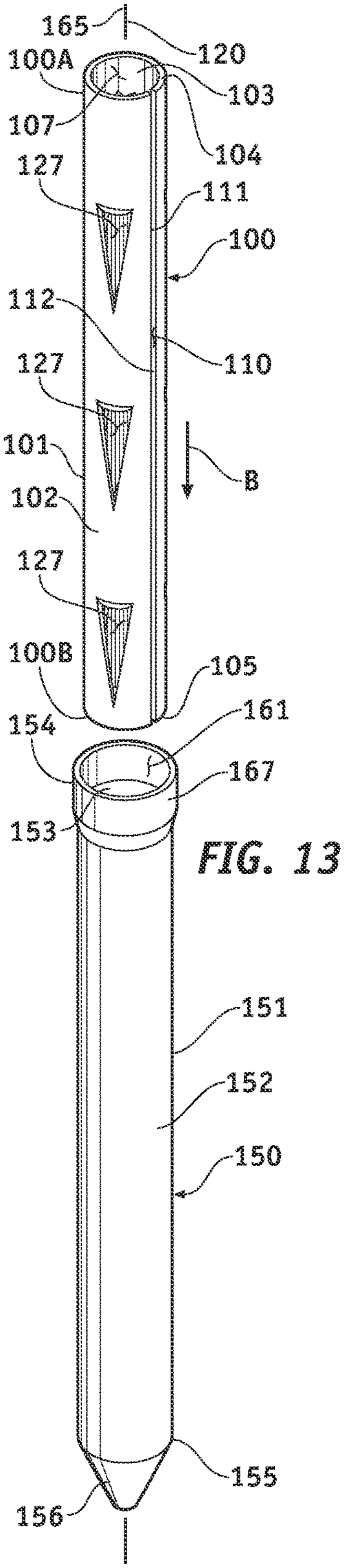
FIGS. 13-15 illustrate a sequence of steps of inserting the static mixer insert of FIG. 8 into a housing to form a static mixer in FIG. 15 according to the invention.
Figure 14:
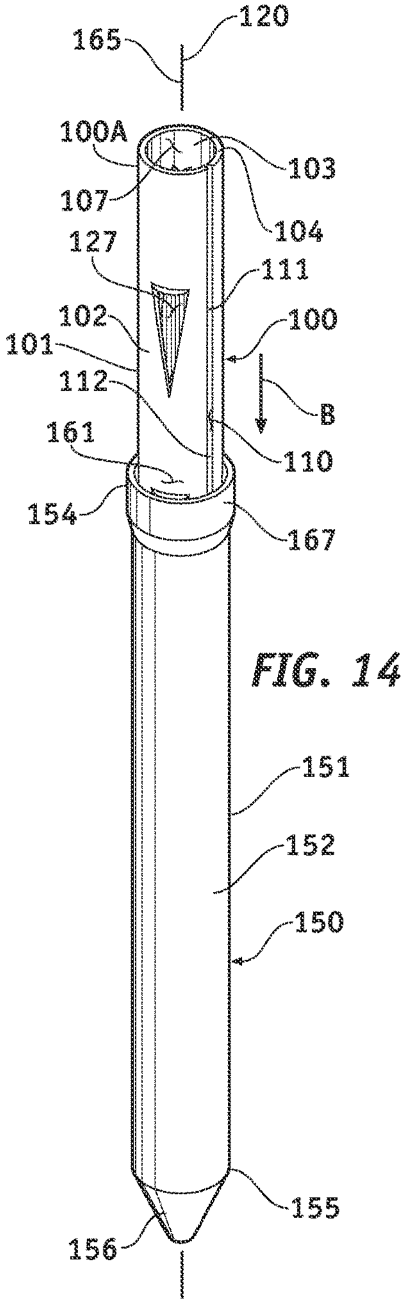
Figure 15:
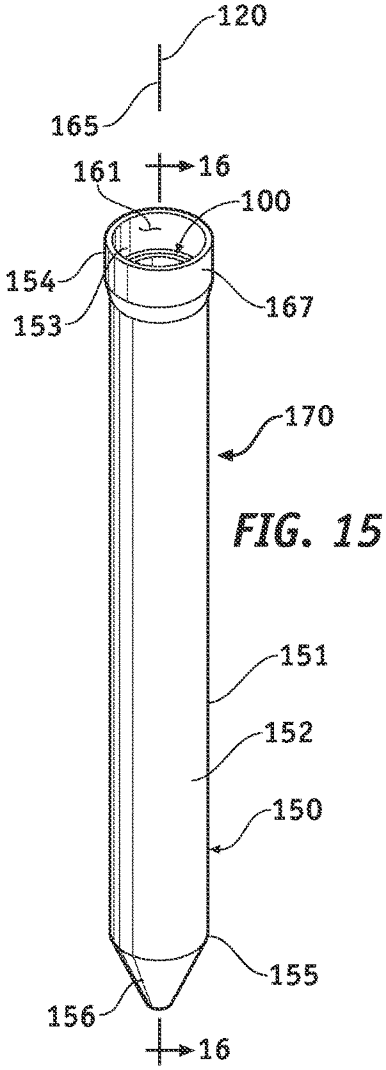
Figure 16:
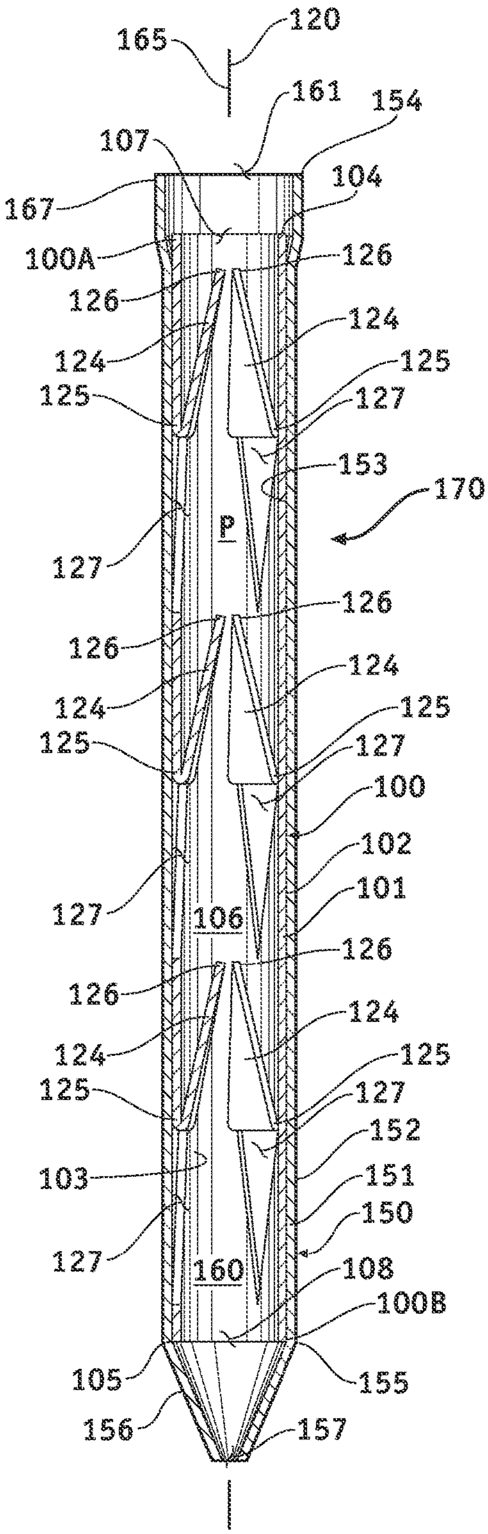
FIG. 16 is a section view taken along line 16-16 of FIG. 15.

Insert 100 is for insertion into a housing 150 in FIGS. 13 and 14 to form a static mixer 170 in FIG. 15 having no moving parts and for the passage therethrough and the mixing of fluid streams. Turning to FIG. 16, housing 150, an elongate, hollow form of plastic or metal or other fluid impervious material or combination of materials, includes continuous sidewall 151 having outer surface 152, inner surface 153, upper edge 154, and lower edge 155. A nozzle 156 having an outlet 157 is affixed to lower edge 155 and cooperates with inner surface 153 to form volume 160. Nozzle 156 is frustoconical and can have other standard or chosen nozzle formats in alternate embodiments. Upper edge 154 encircles inlet 161 to volume 160. Inlet 161, an opening, and outlet 157, a comparatively smaller opening of nozzle 156, are aligned axially at either end of housing 150 and are each open to volume 160 extending longitudinally therebetween. Volume 160 defines a fluid flow path P extending longitudinally through housing 150 from inlet 161 to outlet 157 and is for the passage of fluids therethrough from inlet 161 to outlet 157. Continuous sidewall 151 is arranged about axis 165, extending centrally through volume 160 from inlet 161 to outlet 157. Continuous sidewall 151 is cylindrical in this example, commensurate with the cylindrical shape of insert 100. Part of continuous sidewall 151 proximate to inlet 161 is enlarged collar forming a circumferentially widened area of volume 160, and thus of fluid flow path P, as shown in FIG. 16. Housing 150 is preferably of unitary construction, being one integral body.

Figure 17:
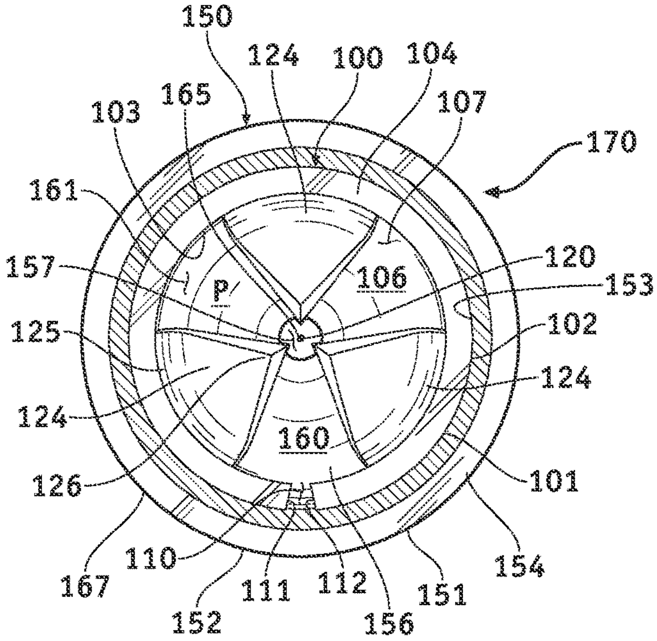
FIG. 17 is a top plan view of the embodiment of FIG. 15.
Figure 18:
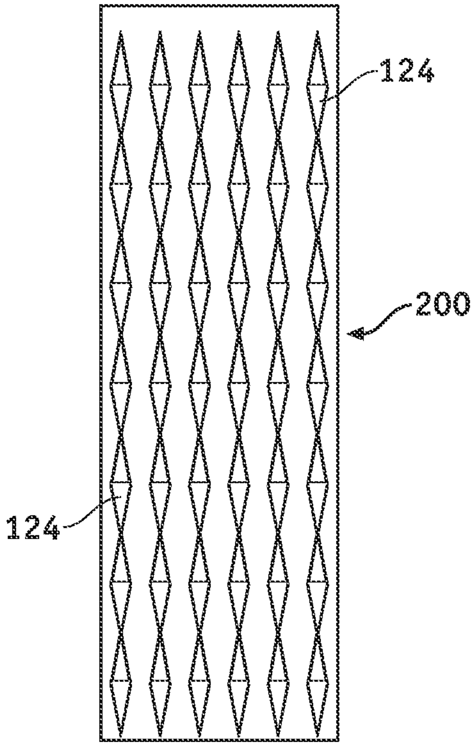
FIG. 18 is a view like FIG. 3 illustrating another embodiment of a static mixer insert segment.

Housing 150 and insert 100 are assembled to form a static mixer 170 in FIGS. 15, 16, and 17 according to the invention by aligning insert 100 inline with volume 160 and concurrently registering discharge end 100B of insert 100 with inlet 161 of housing 150 in FIG. 13. Insert 100 is forcibly inserted into volume 160 simply by sliding it discharge end 100B first into and through fluid flow path P defined by volume 160 through inlet 161 in the direction of arrow B in FIGS. 13 and 14 until, as seen in FIG. 16, discharge end 100B of insert 100A comes into direct contact against nozzle 156, which arrests insert 100 from advancing into nozzle 156. The inherent elastically expansive property of insert 100 allows it to elastically yield to housing 150 automatically when it is inserted therein, which is the case with each insert disclosed throughout this specification. Once insert 100 is installed slidably into volume 160 of housing 150 through its inlet 161, the length of insert 100 from intake end 100A to discharge end 100B is sufficient so that insert 100 extends longitudinally through fluid flow path P defined by volume 160 from discharge end 100B proximate and open to nozzle 156 and its outlet 157 to intake end 100A at collar 167 proximate and open to inlet 161. Part of intake end 100A of insert 100 extends into the widened area of volume 160 defined by collar 167 in FIG. 16 inboard of inlet 161. Insert 100 and housing 150 and their respective volumes 106 and 160 are coaxial about coincident axes 120 and 165. Fluid flow path P extends concurrently through both housing 150 from inlet 161 to outlet 157 and insert 100 from opening 107 of intake end 100A to opening 108 of discharge end 100. Deflectors 124 circumferentially and longitudinally arranged in fluid flow path P each project inwardly into the coaxial volumes 106 and 160 and, thus, into fluid flow path P away from inner surface 153 of housing 150 and from inner surface 103 of annular sidewall 101 between intake end 100B of insert 100 and discharge end 100B of insert 100 without reaching coincident axes 120 and 165 in this example. Since annular sidewall 101 of insert 100 is elastically expansive, it is tensioned when inserted in fluid flow path P of housing 150 to exert an outward pressure or force by outer surface 102 against inner surface 153 of continuous sidewall 151 frictionally engaging outer surface 102 of insert 100 directly against inner surface 153 of housing 150. This frictionally secures insert 100 in volume 160 to housing 150 and thereby secures deflectors 124 in fluid flow path P extending through insert 100 from intake end 100A open to inlet 161 of housing 150 to discharge end 100B open to outlet 157 of nozzle 156.

And so annular sidewall 101 of insert 100 is elastically expansive, having a tendency to expand, to create a resilient frictional fit of outer surface 102 of annular sidewall 101 directly against inner surface 153 of housing 150. Annular sidewall 101 serves as an elastically expansive carrier or frame for deflectors 124 that elastically conforms to and frictionally engages outer surface 102 directly against inner surface 153 of housing 150 when inserted therein. As installed in housing 150, annular sidewall 101 is thereby tensioned due to its inherent tendency to expand urging outer surface 102 in direct frictional engagement against inner surface 153 of housing 150 securing insert 100 in place frictionally according to the invention thereby obviating the need for separate fasteners, welding, adhesive, end caps, or the like. The unit tension or unit pressure, which is the amount of pressure exerted by outer surface 102 of insert 100 against inner surface 153 of housing 150, is sufficient to frictionally secure outer surface 102 of insert 100 to inner surface 153 of housing 150 to thereby secure deflectors 124 in place in fluid flow path P according to the invention. With static mixer 170 so assembled, static mixer 170 being an exemplary housed static mixer, fluid streams, whether gas streams, liquid streams, liquid and gas streams, suitably pumped through fluid pathway P according to standard techniques from inlet 161 to outlet 157 enter fluid pathway P through inlet 161, enter insert 100 through intake end 100A from inlet 161, encounter and are automatically and continuously mixed by deflectors 124 suitably positioned and oriented in fluid flow path P as they flow therethrough and through insert 100 from intake end 100A to discharge end 100B open to outlet 157, enter nozzle 156 from discharge end 100B, and exit suitably mixed through nozzle 156 outlet 157. In an alternate embodiment, side edges 111 and 112 may be secured, such as by welding, adhesive, heat bonding, or the like, to secure annular sidewall 101. In this embodiment, insert 100 is sized accordingly so outer surface 102 directly and sufficiently frictionally engages inner surface 153 of housing 150 to frictionally secure insert 100 in place when insert 100 is inserted into housing 150 as herein described.

To withdraw insert 100 from housing 150 for repair, adjustment, cleaning, replacement, or other servicing of either component, the described method of assembling insert 100 with housing 150 to form static mixer 170 need only be reversed. Since part of intake end 100A of insert 100 extends into the widened area of volume 160 defined by collar 167 in FIG. 16 inboard of inlet 161, it can be taken up by a handheld pliers or other gripping tool and used to pull insert 100 outwardly from fluid flow path P through inlet 161.

As explained above, the deflectors or fluid mixing elements of a static mixer insert segment and the static mixer insert formed therefrom according to the invention can be configured in any desired shape, size, arrangement, and number without departing from this disclosure. The shapes and sizes can be the same or different. Examples static mixer insert segments and corresponding static mixer inserts having varying deflector configurations are shown by way of example in FIGS. 18-36. Except for the varying configurations, the structure of each segment and the corresponding insert formed therewith in the ensuing FIGS. 18-36 and how they are each assembled with a housing to form a static mixer are identical to segment 135 and its corresponding insert 100 and its assembly with housing 150. Accordingly, the same reference numerals are used for segment 135 and insert 100 are also used with each segment and its corresponding insert where appropriate in FIGS. 18-36.

Figure 19:
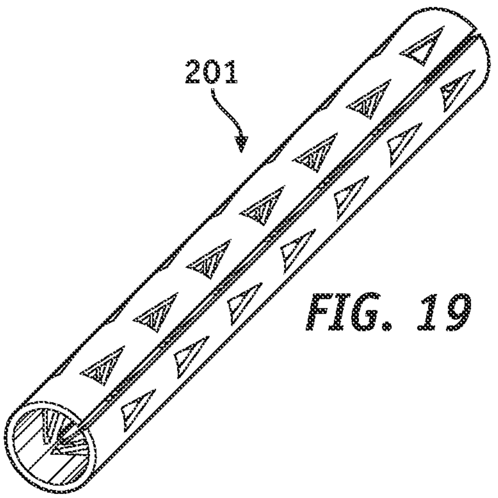
FIG. 19 is a view like FIG. 8 illustrating a static mixer insert formed from the embodiment of FIG. 18.

Turning now to FIGS. 18-36, FIG. 18 illustrates an alternate embodiment of a static mixer insert segment 200 having an array of forty-two small triangular deflectors 124 arranged in parallel rows and upright parallel columns and shown formed into a static mixer insert 201 in FIG. 19.

Figure 20:
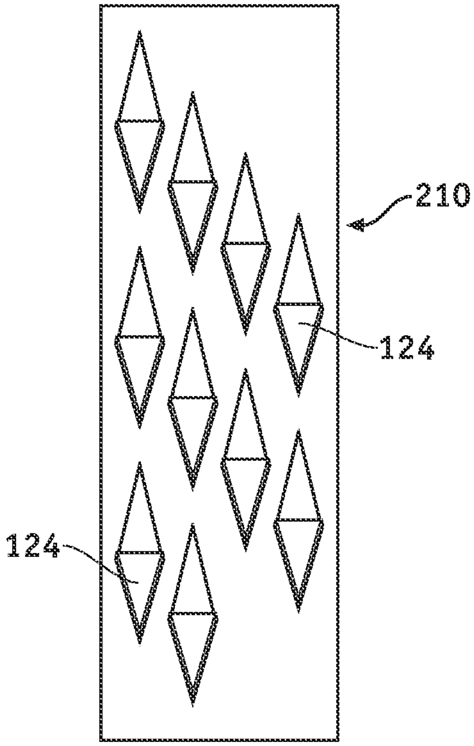
FIG. 20 is a view like FIG. 3 illustrating yet another embodiment of a static mixer insert segment.
Figure 21:
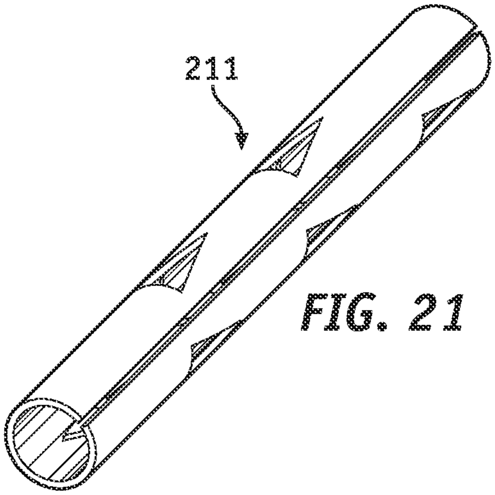
FIG. 21 is a view like FIG. 8 illustrating a static mixer insert formed from the embodiment of FIG. 20.

FIG. 20 illustrates yet another embodiment of a static mixer insert segment 210 having ten triangular deflectors 124 that longitudinally offset from one another larger and that are larger than deflectors 124 of segment 211. FIG. 21 illustrates segment 210 formed into a static mixer insert 211.

Figure 22:
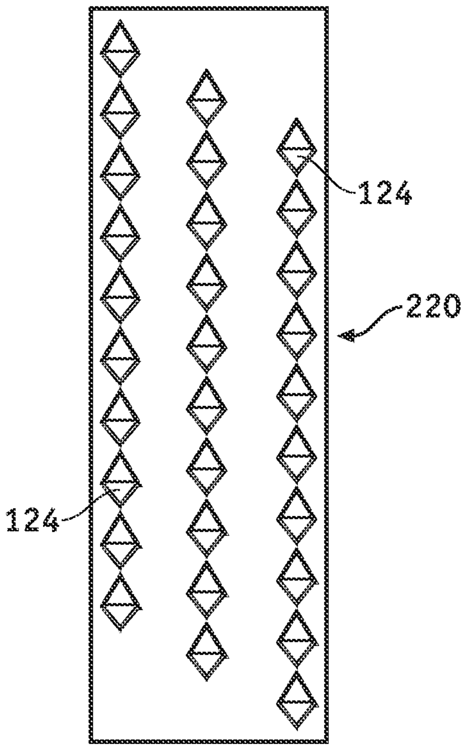
FIG. 22 is a view like FIG. 3 illustrating still another embodiment of a static mixer insert segment.
Figure 23:
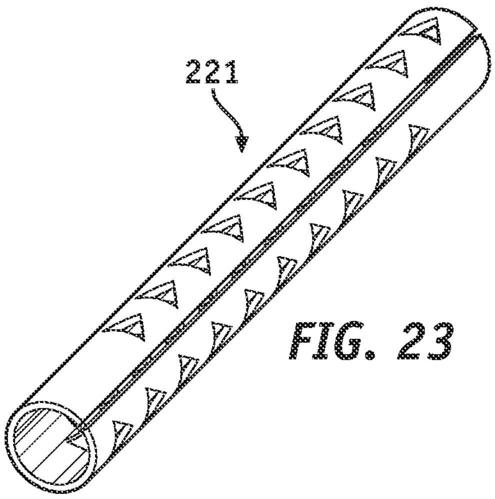
FIG. 23 is a view like FIG. 8 illustrating a static mixer insert formed from the embodiment of FIG. 22.

FIG. 22 illustrates still another embodiment of a static mixer insert segment 220 having thirty triangular deflectors 124 that are squattier and somewhat larger than deflectors 124 of segment 200 and smaller than deflectors 124 of segment 210, and which are arranged in three, upright parallel rows. FIG. 23 illustrates segment 220 formed into a static mixer insert 221.

Figure 24:
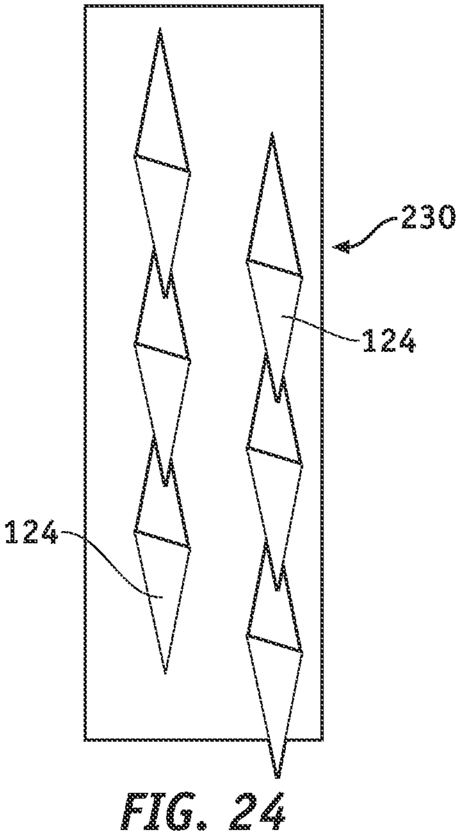
FIG. 24 is a view like FIG. 3 illustrating yet still another embodiment of a static mixer insert segment.
Figure 25:
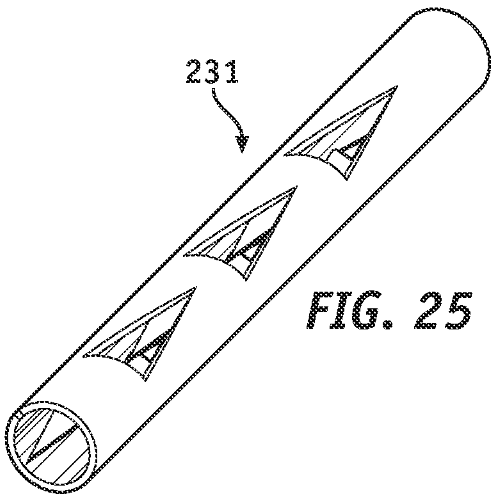
FIG. 25 is a view like FIG. 8 illustrating a static mixer insert formed from the embodiment of FIG. 24.

FIG. 24 illustrates yet still another embodiment of a static mixer insert segment 230 having six, offset triangular deflectors 124 that are somewhat larger than deflectors 124 of segment 210. FIG. 25 illustrates segment 230 formed into a static mixer insert 231.

Figure 26:
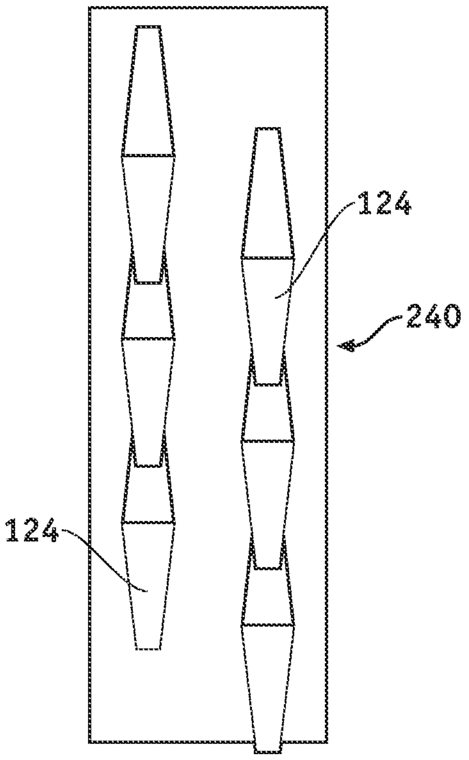
FIG. 26 is a view like FIG. 3 illustrating yet another embodiment of a static mixer insert segment.
Figure 27:
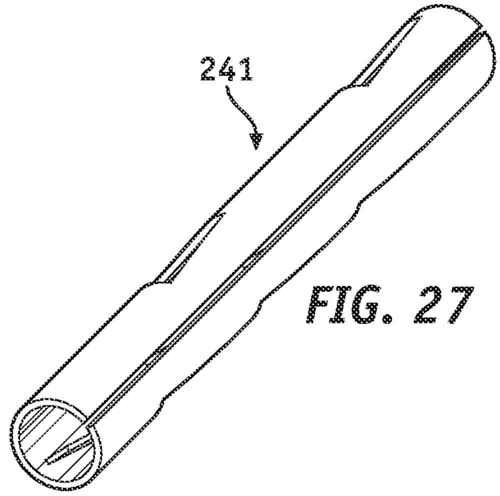
FIG. 27 is a view like FIG. 8 illustrating a static mixer insert formed from the embodiment of FIG. 26.

FIG. 26 illustrates another embodiment of a static mixer insert segment 240 having six deflectors 124 each generally shaped like an isosceles trapezoid. FIG. 27 illustrates segment 240 formed into a static mixer insert 241.

Figure 28:
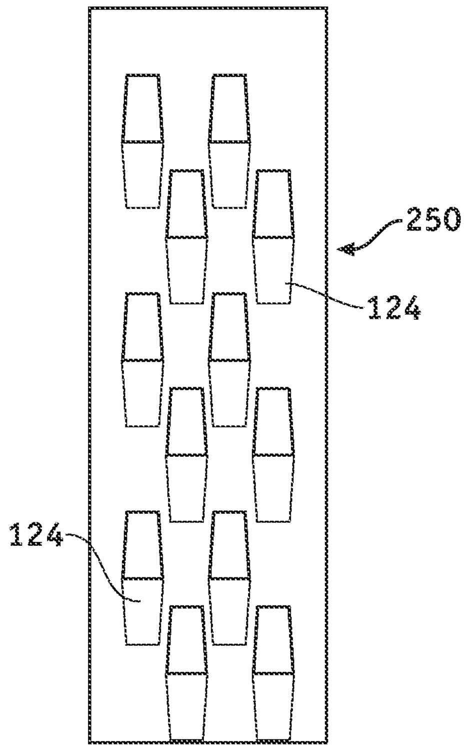
FIG. 28 is a view like FIG. 3 illustrating still another embodiment of a static mixer insert segment.
Figure 29:
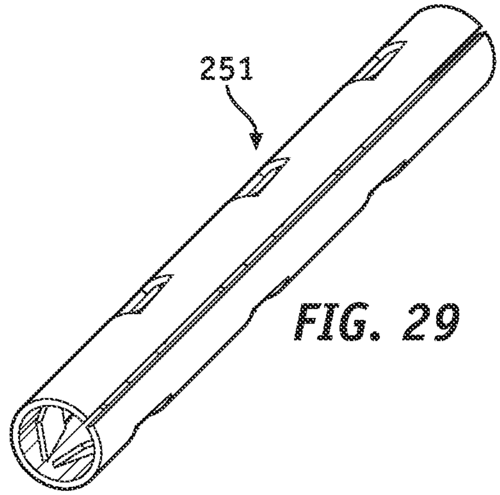
FIG. 29 is a view like FIG. 8 illustrating a static mixer insert formed from the embodiment of FIG. 28.

FIG. 28 illustrates yet another embodiment of a static mixer insert segment 250 having twelve deflectors 124 each generally shaped like those of segment 240 but smaller and squattier in comparison and arranged in six, alternatively offset parallel rows. FIG. 29 illustrates segment 250 formed into a static mixer insert 251.

Figure 30:
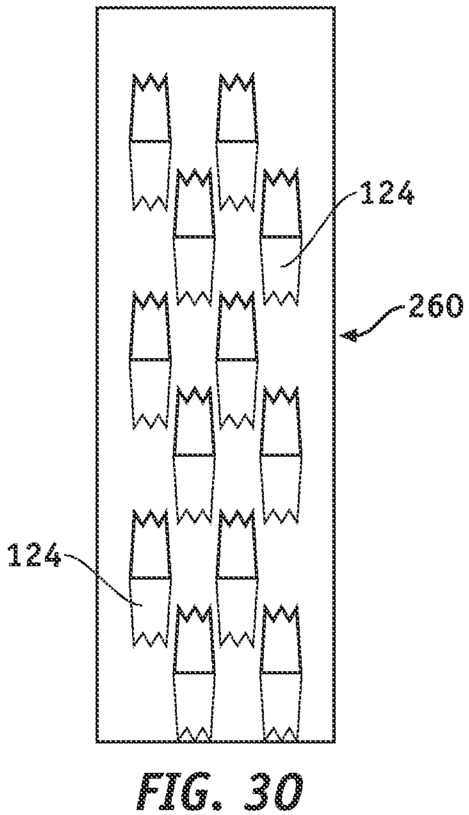
FIG. 30 is a view like FIG. 3 illustrating yet still another embodiment of a static mixer insert segment.
Figure 31:
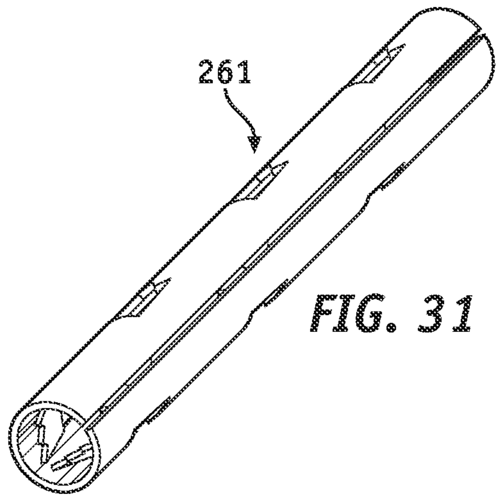
FIG. 31 is a view like FIG. 8 illustrating a static mixer insert formed from the embodiment of FIG. 30.

FIG. 30 illustrates still embodiment of a static mixer insert segment 260 that is similar to segment 250 except that the outer end 126 of each deflector 124 is jagged. FIG. 31 illustrates segment 260 formed into a static mixer insert 261.

Figure 32:
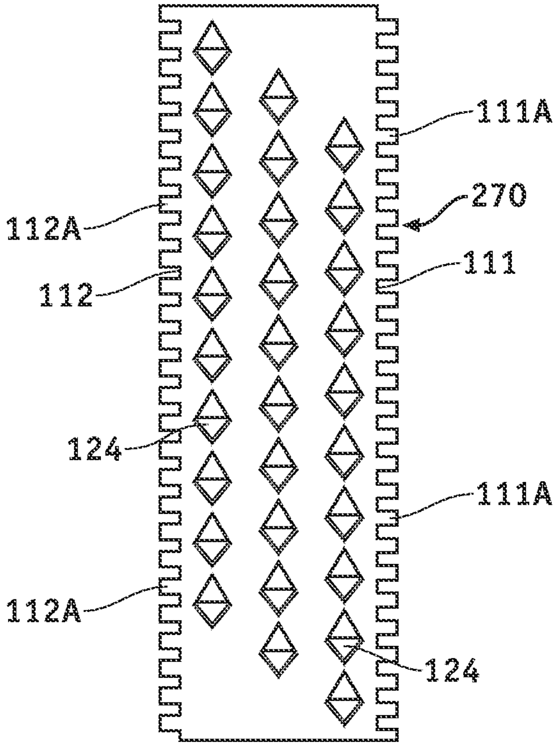
FIG. 32 is a view like FIG. 3 illustrating yet another embodiment of a static mixer insert segment.
Figure 33:
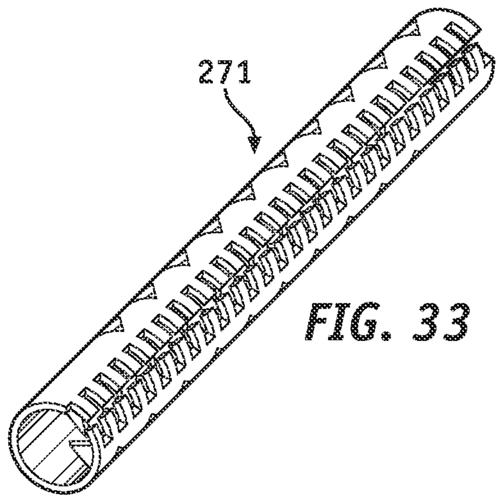
FIG. 33 is a view like FIG. 8 illustrating a static mixer insert formed from the embodiment of FIG. 32.
Figure 34:
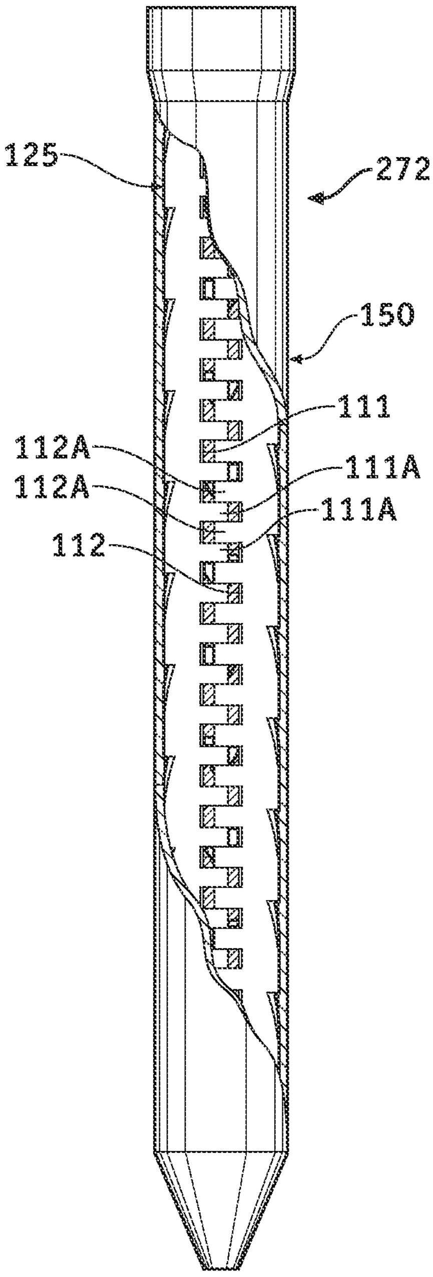
FIG. 34 is a side elevation of a static mixer including an assembly of a housing and the static mixer insert of FIG. 33, with portions of the housing being broken away for illustrative purposes.

FIG. 32 illustrates yet still another embodiment of a static mixer insert segment 270 that is similar to segment 220 except that the side edges 111 and 112 are configured with teeth 111A and 112A. FIG. 33 illustrates segment 270 formed into a static mixer insert 271. In FIG. 34, teeth 111A and 112A intermesh when insert 271 is installed in housing 150 to form static mixer 272. The intermeshing of teeth 111A with teeth 112A mechanically disables side edges 111 and 112 from longitudinally displacing relative to one another in static mixer 272.

Figure 35:
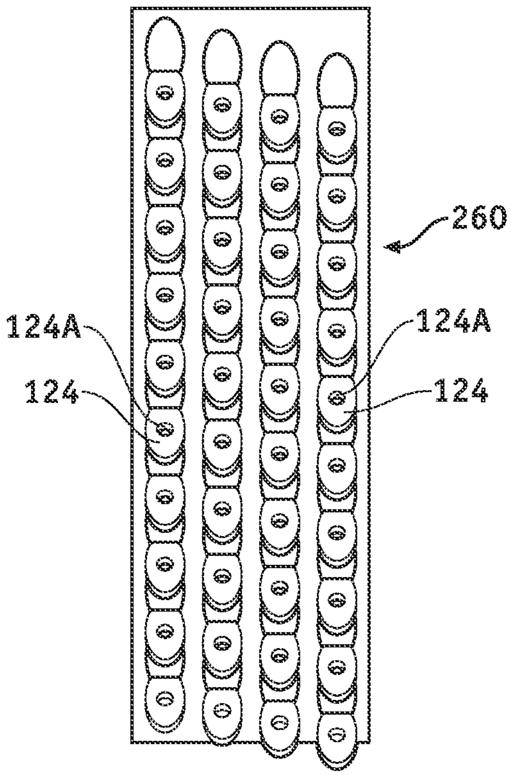
FIG. 35 is a view like FIG. 3 illustrating still another embodiment of a static mixer insert segment.
Figure 36:
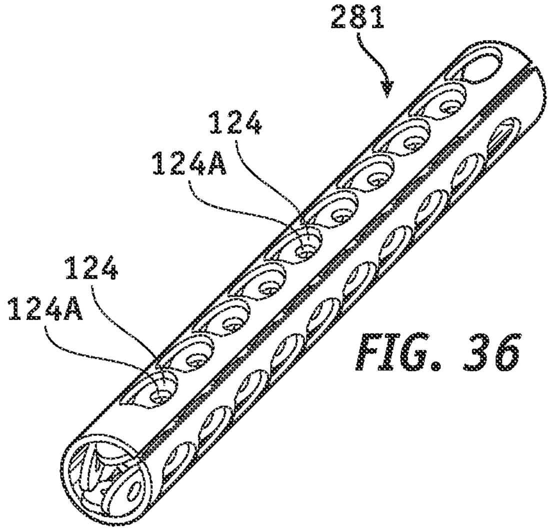
FIG. 36 is a view like FIG. 8 illustrating a static mixer insert formed from the embodiment of FIG. 35.

FIG. 35 illustrates yet another embodiment of a static mixer insert segment 280 having forty deflectors 124. An opening or hole 124A through each deflector 124 enhances its fluid mixing property by imparting more fluid turbulence in the fluid streams. FIG. 36 illustrates segment 250 formed into a static mixer insert 281.

Figure 37:
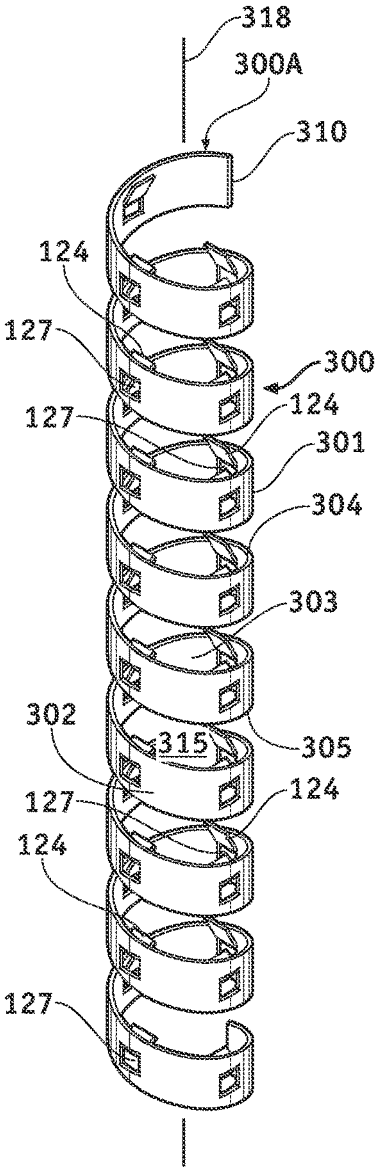
FIG. 37 is a perspective view of a helical static mixer insert constructed and arranged according to the invention.
Figure 38:
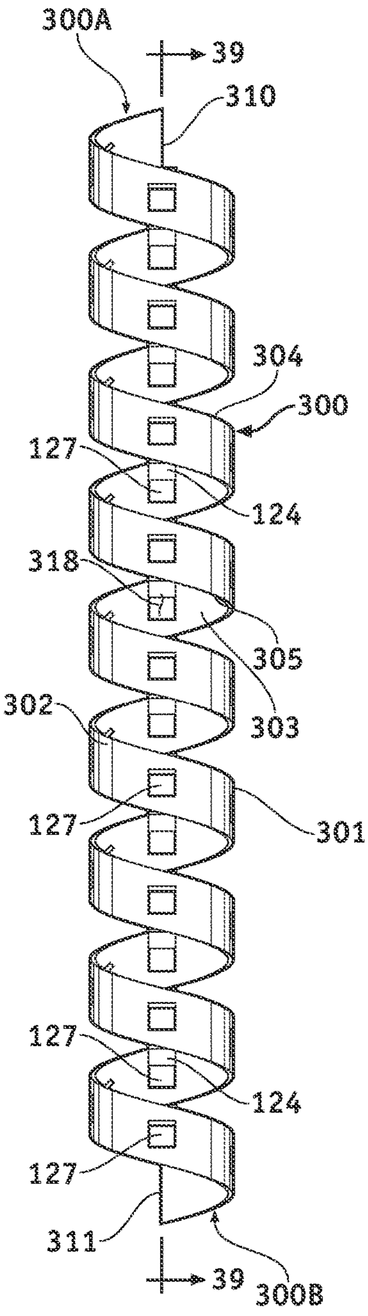
FIG. 38 is a side elevation view of the embodiment of FIG. 37.
Figure 39:
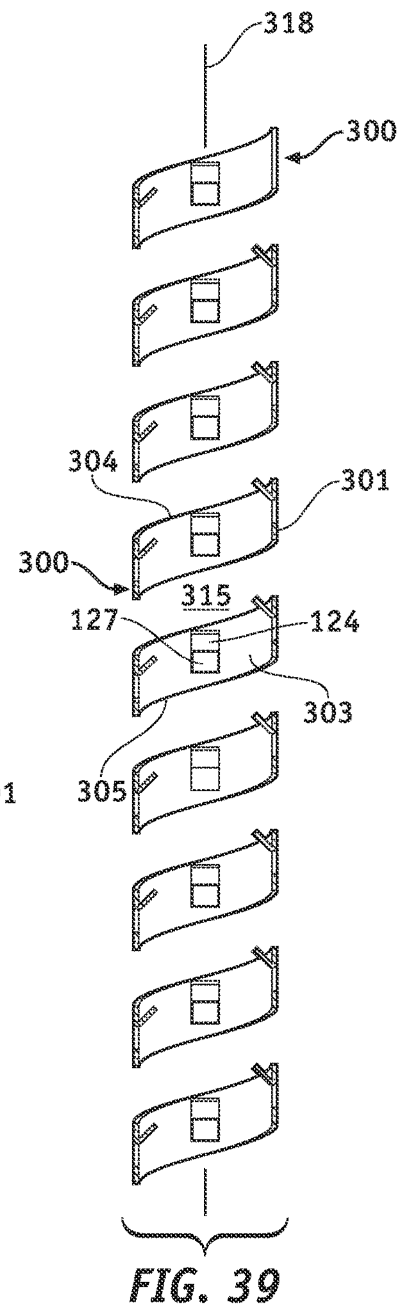
FIG. 39 is a section view taken along line 39-39 of FIG. 38.

Attention is now directed to FIGS. 37-39 illustrating still another embodiment of a static mixer insert 300 constructed and arranged according to the invention. Insert 300 is for insertion into a housing for mixing fluid streams applied through the housing, whether gas streams, fluid streams, or fluid and gas streams, similar to insert 100. Insert 300 includes a helical member 301 having outer surface 302, inner surface 303, upper edge 303, and lower edge 304 concurrently extending helically between a proximal end 310 at an intake end 300A of helical member 301 and a distal end 311 at a discharge end 300B of helical member 301. Helical member 301 is a circular helix, i.e. one with a constant radius. In this example, helical member 301 is a helical sidewall extending vertically upright, in which inner and outer surfaces 302 and 303 are flat and parallel relative to one another. Inner surface of 302 of helical member 301 spirals about a volume 315 for the passage of fluid streams extending longitudinally through insert 300 from intake end 300A open to volume 315 to discharge end 300B open from volume 315. In other words, helical member 301 spirals about and defines volume 315 extending longitudinally therethrough by inner surface 303.

Intake end 300A and discharge end 300B are each open to volume 315 and are aligned axially. Helical member 301 is arranged about axis 318, extending centrally through volume 315 from intake end 300A to discharge end 300B. Helical member 301 is tensionable, being fabricated of plastic, a malleable metal, such as ductile iron, or steel, a cellulosic composition, or other like or similar material or combination of materials.

Identical to the previously-described inserts, insert 300 has deflectors 124 dispersed therethroughout. The array of deflectors 124 are arranged in a predetermined pattern along the length of helical member 301 between intake end 300A and discharge end 300B. In this embodiment, deflectors 124 are spaced apart along the length of helical member 301 between proximal end 310 at the intake end 300A of insert 300 and distal end 311 at the discharge end 300B of insert 300. Since deflectors 124 follow helical member 301, they are spaced apart helically. Deflectors 124 are equally spaced apart in this embodiment, being equally spaced apart helically between intake end 300A and discharge end 300B, and are each centered between upper and lower edges 304 and 305. The spacing between adjacent deflectors 124 and the arrangement of deflectors 124 between intake and discharge ends 300A and 300B can vary in alternate embodiments.

Each deflector 124 is flat and extends from base or inner end 125 connected to helical member 301 to free or outer end 126. Each deflector 124 projects inwardly into volume 315 from inner surface 303 and angularly upward relative to inner surface 303 toward intake end 300A from base 125 to free end 126 inboard of or otherwise without reaching axis 318 about which helical member 301 is arranged. Helical member 301 is formed unitarily with deflectors 124, each being of the same material as helical member 301, in which base 125 of each deflector 124 is integral with helical member 301. Like insert 100, each deflector 124 of insert 300 is cut into helical member 301 and bent at its base 125 inwardly into volume 315 from inner surface 303 and out from an opening 127 therefor or otherwise from whence it was cut extending through helical member 301 from outer surface 302 to inner surface 303. Deflectors 124 in this embodiment are coextensive and are each generally square in shape, although they may be of any desired shape or relative size as required. Insert 300 has a length from intake end 300A to discharge end 300B and has a standard or general length suitable for cutting to a correct length, or a preselected length corresponding to a specific application.

Figures 40, 41, 42, 43, 44:
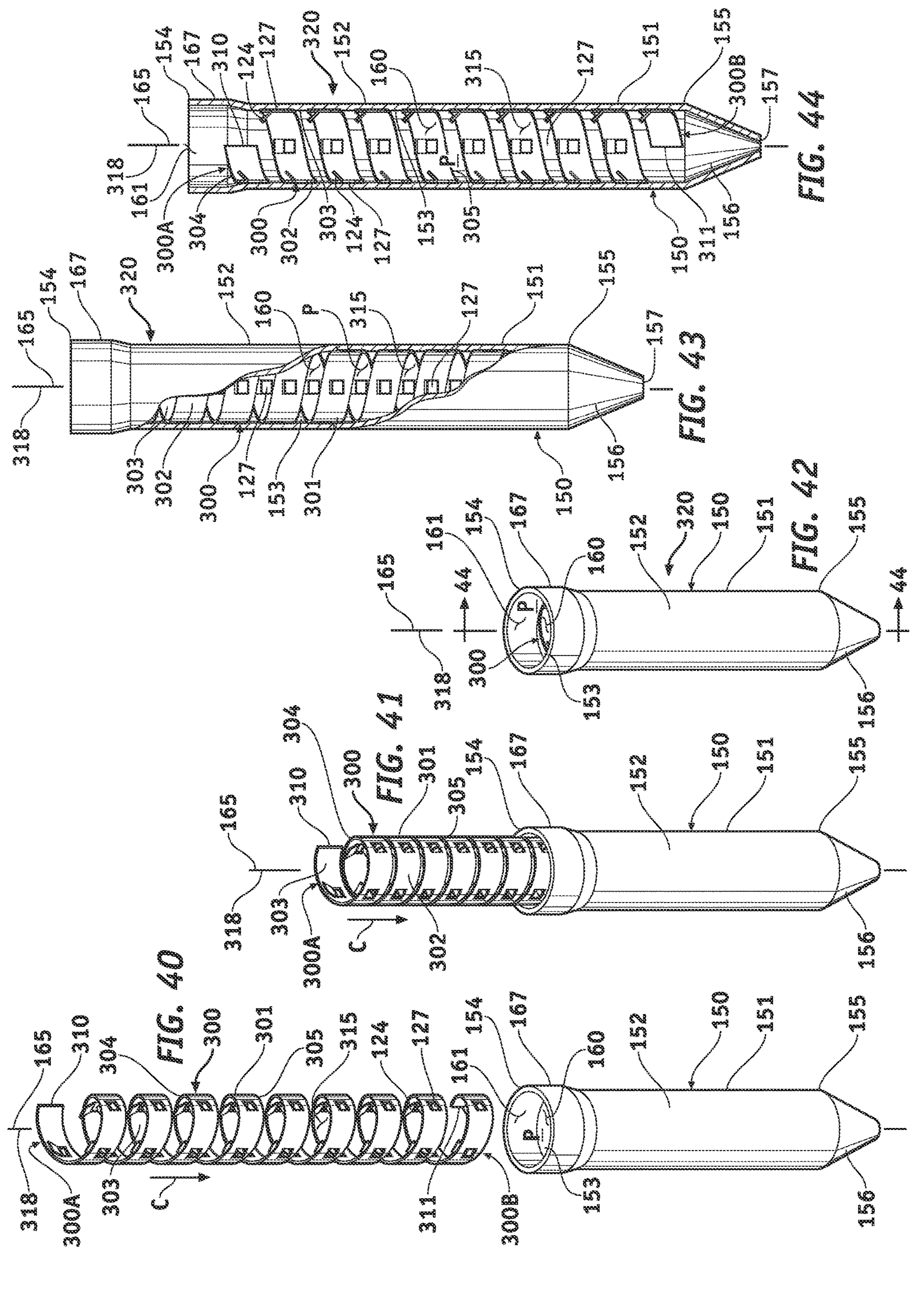
FIGS. 40-42 illustrate a sequence of steps of inserting the helical static mixer insert first illustrated in into a housing to form a static mixer in FIG. 42 according to the invention.
FIG. 43 is a side elevation view of the embodiment of FIG. 42 with portions of the housing broken away for illustrative purposes.
FIG. 44 is a section view taken alone line 44-44 of FIG. 42.

Insert 300 is configured for insertion into the previously-described housing 150 in FIGS. 40 and 41 to form a static mixer 320 in FIGS. 42 and 44 having no moving parts and for the passage therethrough and the mixing of fluid streams. Housing 150 and insert 300 are assembled to form static mixer 320 by aligning insert 300 inline with volume 160 and concurrently registering discharge end 300B of insert 300 with inlet 161 of housing 150 in FIG. 40. Insert 300 is forcibly inserted into volume 160 simply by twisting it slightly to compress it as shown in FIG. 41 to slightly reduce its outer diameter and sliding it discharge end 300B first into and through fluid flow path P defined by volume 160 through inlet 161 in the direction of arrow C in FIGS. 40 and 41 until, as seen in FIG. 44, discharge end 300B of insert 300 comes into direct contact against nozzle 156, which arrests insert 300 from advancing into nozzle 156. The inherent elastically expansive property of insert 300 allows it to elastically yield to housing 150 automatically when it is inserted therein. Once insert 300 is installed slidably into volume 160 of housing 150 through its inlet 161, the length of insert 300 from intake end 300A to discharge end 300B is sufficient so that insert 300 extends longitudinally and helically through fluid flow path P defined by volume 160 from discharge end 300B proximate and open to nozzle 156 and its outlet 157 to intake end 300A at collar 167 proximate and open to inlet 161. Part of intake end 300A of insert 300 extends into the widened area of volume 160 defined by collar 167 in FIG. 44 inboard of inlet 161. Insert 300 and housing 150 and their respective volumes 315 and 160 are coaxial about coincident axes 318 and 165. Fluid flow path P extends concurrently through both housing 150 from inlet 161 to outlet 157 and insert 300 from intake end 300A to discharge end 300B. Deflectors 124 helically arranged in fluid flow path P each project inwardly into the coaxial volumes 315 and 160 and, thus, into fluid flow path P away from inner surface 153 of housing 150 and from inner surface 303 of helical member 301 between intake end 300A of insert 300 and discharge end 300B of insert 300 without reaching coincident axes 318 and 165 in this example. Since helical member 301 of insert 300 is elastically expansive, it is tensioned and partially uncompressed when inserted in fluid flow path P of housing 150 in FIG. 44 to exert an outward pressure or force by outer surface 302 against inner surface 153 of continuous sidewall 151 frictionally engaging outer surface 302 of insert 300 directly against inner surface 153 of housing 150. This frictionally secures insert 300 in volume 160 to housing 150 and thereby secures deflectors 124 in fluid flow path P extending through insert 300 from intake end 300A open to inlet 161 of housing 150 to discharge end 300B open to outlet 157 of nozzle 156.

And so helical member 301 of insert 300 is elastically expansive, having a tendency to expand, to create a resilient frictional fit of outer surface 302 of helical member 301 directly against inner surface 153 of housing. Helical member 301 serves as another embodiment of an elastically expansive carrier or frame for deflectors 124 according to the invention that elastically conforms to and frictionally engages outer surface 302 direction against inner surface 153 of housing 150 when inserted therein according to the invention. As installed in housing 150, helical member 301 is tensioned due to its inherent tendency to expand urging outer surface 302 in direct frictional engagement against inner surface 153 of housing 150 securing insert 300 in place frictionally according to the invention thereby obviating the need for separate fasteners, welding, adhesive, end caps, or the like. The unit tension or unit pressure, which is the amount of pressure exerted by outer surface 302 of insert 300 against inner surface 153 of housing 150, is sufficient to frictionally secure outer surface 302 of insert 300 to inner surface 153 of housing 150 to thereby secure deflectors 124 in place in fluid flow path P according to the invention. With static mixer 320 so assembled, static mixer 320 being an exemplary housed static mixer, fluid streams, whether gas streams, liquid streams, liquid and gas streams, suitably pumped through fluid pathway P according to standard techniques from inlet 161 to outlet 157 enter fluid pathway P through inlet 161, enter insert 300 through intake end 300A from inlet 161, encounter and are automatically and continuously mixed by deflectors 124 suitably positioned and oriented in fluid flow path P as they flow therethrough and through insert 300 from intake end 300A to discharge end 300B open to outlet 157, enter nozzle 156 from discharge end 300B, and exit suitably mixed through outlet 157 from discharge end 300B.

To withdraw insert 300 from housing 150 for repair, adjustment, cleaning, replacement, or other servicing of either component, the described method of assembling insert 300 with housing 150 to form static mixer 320 need only be reversed. Since part of intake end 300A of insert 300 extends into the widened area of volume 160 defined by collar 167 in FIG. 44 inboard of inlet 161, it can be taken up by a handheld pliers or other gripping tool and used to pull insert 300 outwardly from fluid flow path P through inlet 161.

Figure 47:
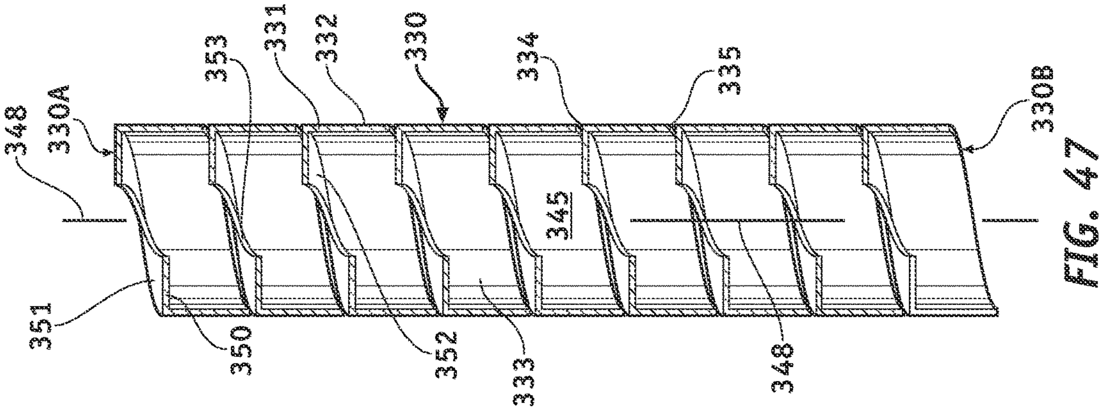
FIG. 47 is a section view taken along line 47-47 of FIG. 46.
Figure 46:
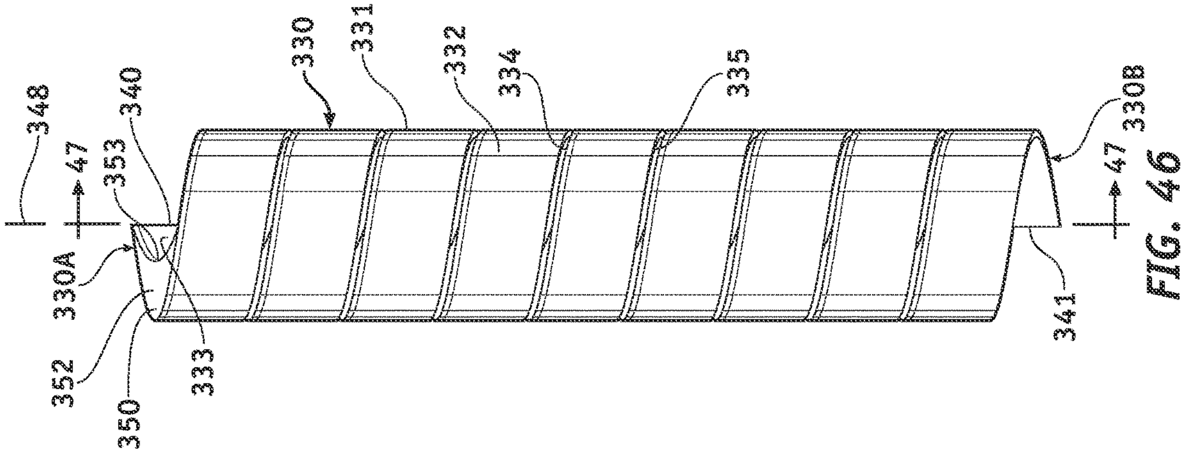
FIG. 46 is a side elevation view of the embodiment of FIG. 45.
Figure 45:
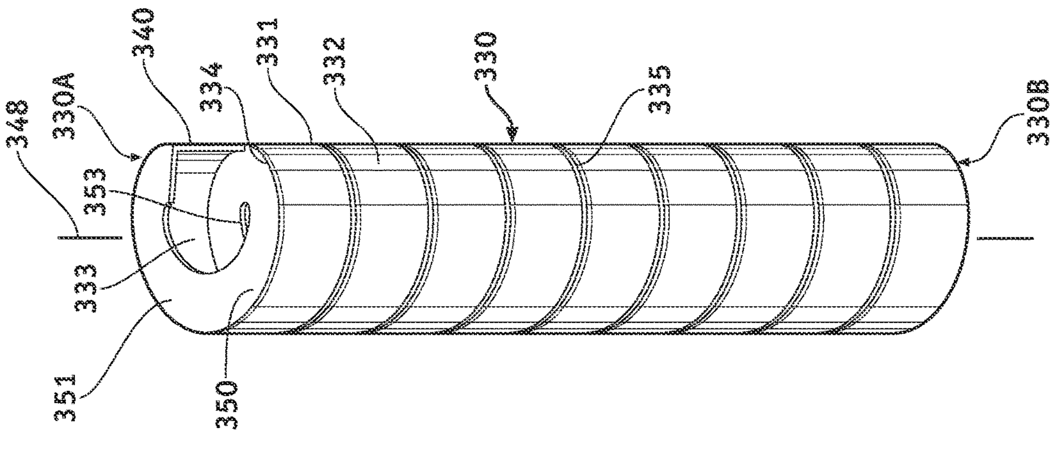
FIG. 45 is a perspective view of another embodiment of a helical static mixer insert constructed and arranged according to the invention.

FIGS. 45-47 illustrates still another embodiment of a static mixer insert 330 constructed and arranged according to the invention. Insert 330 is configured for insertion into a housing for mixing fluid streams applied through the housing, whether gas streams, fluid streams, or fluid and gas streams. Insert 330, made up of helical member 331 and helical deflector 350, is tensionable, being fabricated of plastic, a malleable metal, such as ductile iron, or steel, or other like or similar material useful for compression seating according to the invention.

Helical member 331 has outer surface 332, inner surface 333, upper edge 333, and lower edge 334, all of which concurrently extend helically between a proximal end 340 at an intake end 330A of insert 300 and a distal end 341 at a discharge end 330B of insert 300. In this example, helical member 331 is a helical sidewall extending vertically upright, in which inner and outer surfaces 332 and 333 are flat and parallel relative to one another. Inner surface of 333 of helical member 301 spirals about a volume 345 for the passage of fluid streams extending longitudinally through insert 330 from intake end 330A open to volume 345 to discharge end 330B open from volume 345. In other words, helical member 331 spirals about and defines volume 345 extending longitudinally therethrough by inner surface 333. Intake end 330A and discharge end 330B, each of which are open to volume 345, are aligned axially. Helical member 331 is a circular helix, i.e. one with a constant radius, arranged about axis 348 extending centrally through volume 345 from intake end 330A to discharge end 330B.

Helical deflector 350 has upper surface 351, lower surface 352, and outer edge 353, all of which concurrently extend helically between a proximal end 350 at an intake end 330A of insert 300 and a distal end 341 at a discharge end 330B of insert 300. Deflector 350, a helical platform, extends inwardly into volume 345 from helical member 331 to outer edge 353 inboard of or otherwise without reaching axis 348 and longitudinally and helically through volume 345 along the length of insert 330 from proximal end 340 at the intake end 330A of insert 330 to distal end 341 at the discharge end 330B of insert 330. Deflector 350 extends helically about axis 348 through volume 345 from proximal end 340 at the intake end 330A of insert 330 to distal end 341 at the discharge end 330B of insert 330. Deflector 350 helically follows helical member 331 and extends inwardly into volume 345 in this example from upper edge 334 to outer edge 353, being bent inwardly from upper edge 334 in this particular example. Insert 330 is formed unitarily with deflector 350, in which deflector 350 is integral with helical member 331. Like helical member 331, deflector 350 is a circular helix, i.e. one with a constant radius, arranged about axis 348 extending centrally through volume 345 from intake end 330A to discharge end 330B.

Figure 48:
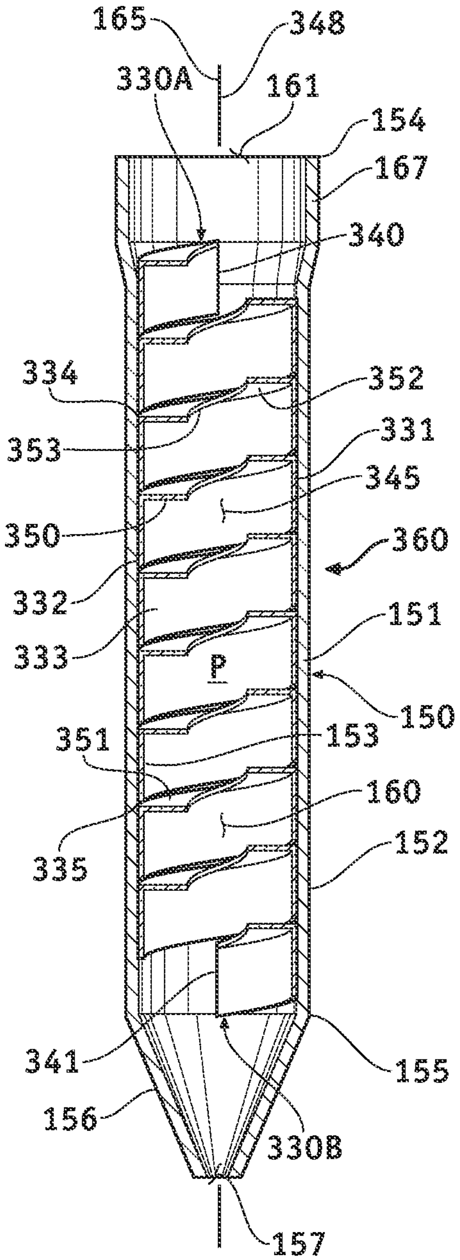
FIG. 48 is a vertical section view of a static mixer formed with the embodiment of FIGS. 45-47.

Insert 330 is configured for insertion into the previously-described housing 150 to form a static mixer 360 in FIG. 48 having no moving parts and for the passage therethrough and the mixing of fluid streams. Housing 150 and insert 330 are assembled to form static mixer 360 by aligning insert 330 inline with volume 160 and concurrently registering discharge end 330B of insert 330 with inlet 161 of housing 150. Insert 330 is forcibly inserted into volume 160 by sliding it discharge end 330B first into and through fluid flow path P defined by volume 160 through inlet 161 until, as seen in FIG. 46, discharge end 330B of insert 330 comes into direct contact against nozzle 156, which arrests insert 330 from advancing into nozzle 156. The inherent elastically expansive property of insert 330 allows it to elastically yield to housing 150 automatically when it is inserted therein. Once insert 330 is installed slidably into volume 160 of housing 150 through its inlet 161, the length of insert 330 from intake end 330A to discharge end 330B is sufficient so that insert 330 extends longitudinally and helically through fluid flow path P defined by volume 160 from discharge end 330B proximate and open to nozzle 156 and its outlet 157 to intake end 330A at collar 167 proximate and open to inlet 161. Part of intake end 330A of insert 330 extends into the widened area of volume 160 defined by collar 167 in FIG. 46 inboard of inlet 161. Insert 330 and housing 150 and their respective volumes 345 and 160 are coaxial about coincident axes 348 and 165. Fluid flow path P extends concurrently through both housing 150 from inlet 161 to outlet 157 and insert 330 from intake end 330A to discharge end 330B. Deflector 350 longitudinally and helically arranged in fluid flow path P about coincident axes 348 and 160 projects inwardly into the coaxial volumes 345 and 160 and, thus, into fluid flow path P away from inner surface 153 of housing 150 and from inner surface 333 of helical member 331 between intake end 330A of insert 330 and discharge end 330B of insert 330 without reaching coincident axes 348 and 165 in this example. Since insert 300 is elastically expansive, it is tensioned when inserted in fluid flow path P of housing 150 in FIG. 44 to exert an outward pressure or force by outer surface 332 of helical member 331 against inner surface 153 of continuous sidewall 151 frictionally engaging outer surface 332 of insert 330 directly against inner surface 153 of housing 150. This frictionally secures insert 330 in volume 160 to housing 150 and thereby secures deflector 350 in fluid flow path P extending through insert 330 from intake end 330A open to inlet 161 of housing 150 to discharge end 330B open to outlet 157 of nozzle 156.

And so insert 330 is elastically expansive, having a tendency to expand, to create a resilient frictional fit of outer surface 332 of helical member 331 directly against inner surface 153 of housing 150. Accordingly, annular helical member 331 serves as an elastically expansive carrier that elastically conforms to and frictionally engages inner surface 153 of housing 150 when inserted therein. As installed in housing 150, insert 300 is tensioned due to its inherent tendency to expand urging outer surface 332 in frictional engagement against inner surface 153 of housing 150 securing insert 330 in place frictionally according to the invention thereby obviating the need for separate fasteners, welding, adhesive, end caps, or the like. The unit tension or unit pressure, which is the amount of pressure exerted by outer surface 332 of insert 330 against inner surface 153 of housing 150, is sufficient to frictionally secure outer surface 332 of insert 330 to inner surface 153 of housing 150 to thereby secure deflector 350 in place in fluid flow path P according to the invention. With static mixer 360 so assembled, static mixer 360 being an exemplary housed static mixer, fluid streams, whether gas streams, liquid streams, liquid and gas streams, suitably pumped through fluid pathway P according to standard techniques from inlet 161 to outlet 157 enter fluid pathway P through inlet 161, enter insert 330 through intake end 330A from inlet 161, encounter and are automatically and continuously and helically mixed by deflector 350 suitably positioned and oriented in fluid flow path P as they flow therethrough and through insert 330 from intake end 330A to discharge end 330B open to outlet 157, enter nozzle 156 from discharge end 330B, and exit suitably mixed through outlet 157 from discharge end 330B.

To withdraw insert 330 from housing 150 for repair, adjustment, cleaning, replacement, or other servicing of either component, the described method of assembling insert 330 with housing 150 to form static mixer 360 need only be reversed. Since part of intake end 330A of insert 330 extends into the widened area of volume 160 defined by collar 167 in FIG. 48 inboard of inlet 161, it can be taken up by a handheld pliers or other gripping tool and used to pull insert 330 outwardly from fluid flow path P through inlet 161.

Figure 49:
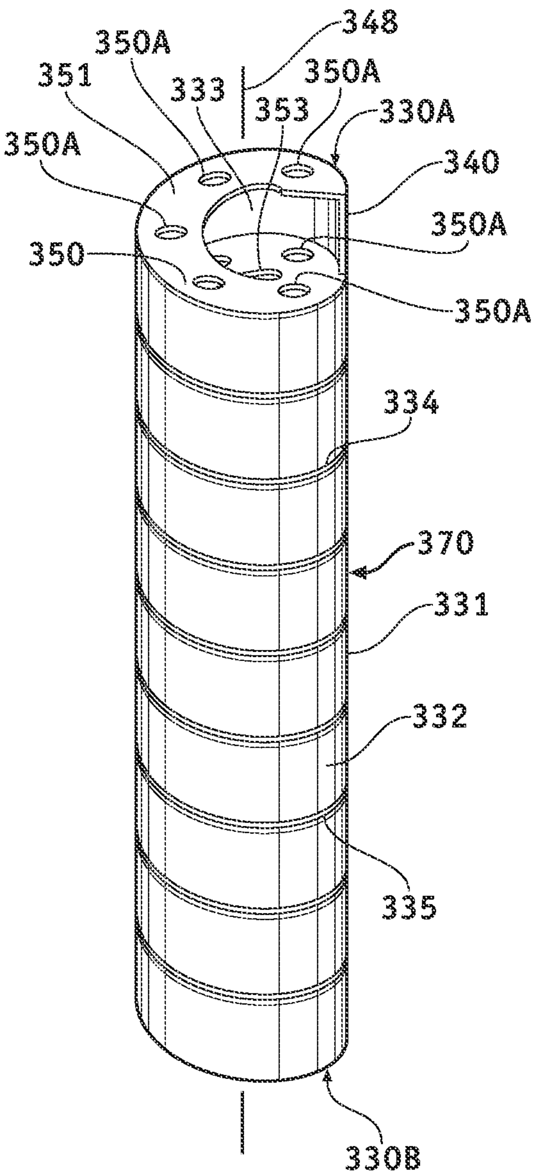
FIG. 49 is a perspective view of yet another embodiment of a helical static mixer insert constructed and arranged according to the invention.
Figure 52:
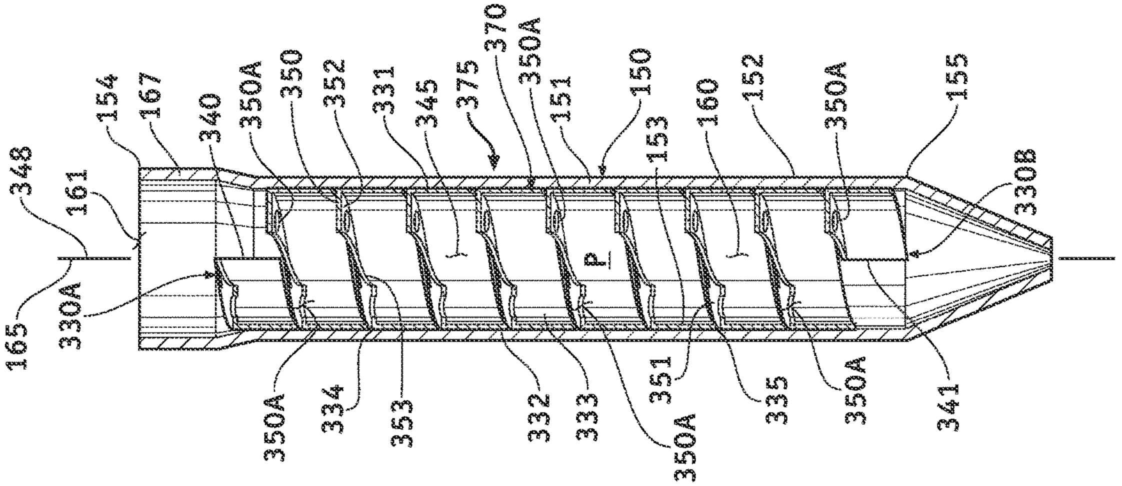
FIG. 52 is a vertical section view of a static mixer formed with the embodiment of FIGS. 49-51.
Figure 51:
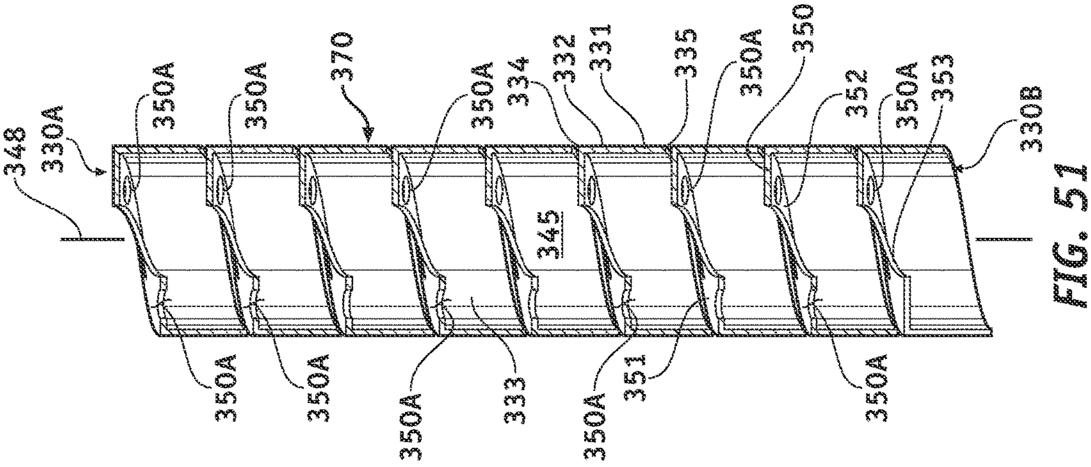
FIG. 51 is a section view taken along line 51-51 of FIG. 50.
Figure 50:
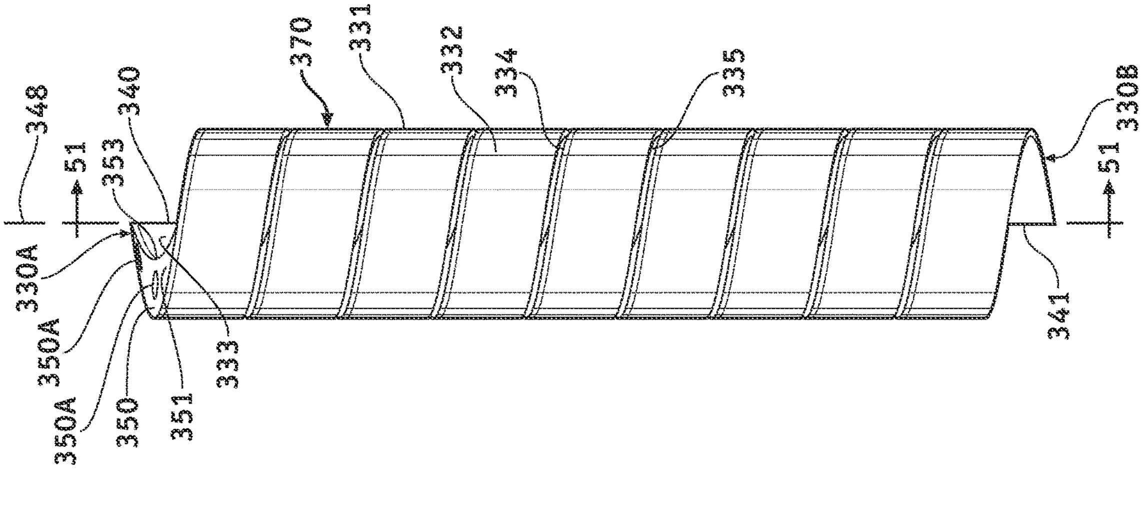
FIG. 50 is a side elevation view of the embodiment of FIG. 49.

FIGS. 49-51 illustrate still another embodiment of a static mixer insert 370 constructed and arranged according to the invention. Insert 370 is configured for insertion into a housing for mixing fluid streams applied through the housing, whether gas streams, fluid streams, or fluid and gas streams. Insert 370 is identical in every respect to insert 330 and is assembled with housing 150 to form a static mixer 375 in FIG. 52 in the same way insert 330 and housing 150 are assembled. Accordingly, the previously discussion of insert 330 and its static mixer 360 applies in every respect to insert 370 and its static mixer 375, and the same reference characters are used. The difference between insert 330 and insert 370 is that deflector 350 of insert 370 has openings 350A, which enhance the mixing property of deflector 350 by imparting more fluid turbulence in the fluid streams compared to deflector 350 of insert 330. Openings 350A extend through deflector 350 of insert 370 between upper edge 334 of helical member 331 and outer edge 353 of deflector 350. Openings 350A follow deflector 350 are spaced apart along the length of deflector 350 from intake end 330A to discharge end 330B. Since openings 350A follow deflector 350 of insert 370, they are helically spaced apart along the length of deflector 350 between intake end 330A and discharge end 330B. Openings 350A are equally spaced in insert 370, although the distance between adjacent openings 350A can vary in alternate embodiments.

Each of the static mixer inserts discussed above include a housing configured with one insert. A static mixer constructed and arranged according to the invention can be configured with more than one insert in alternate embodiments, whether two identical inserts as shown in static mixer 380 in FIG. 53 or two different inserts as shown in static mixer 390 in FIG. 54, stacked one atop the other.

Figure 53:
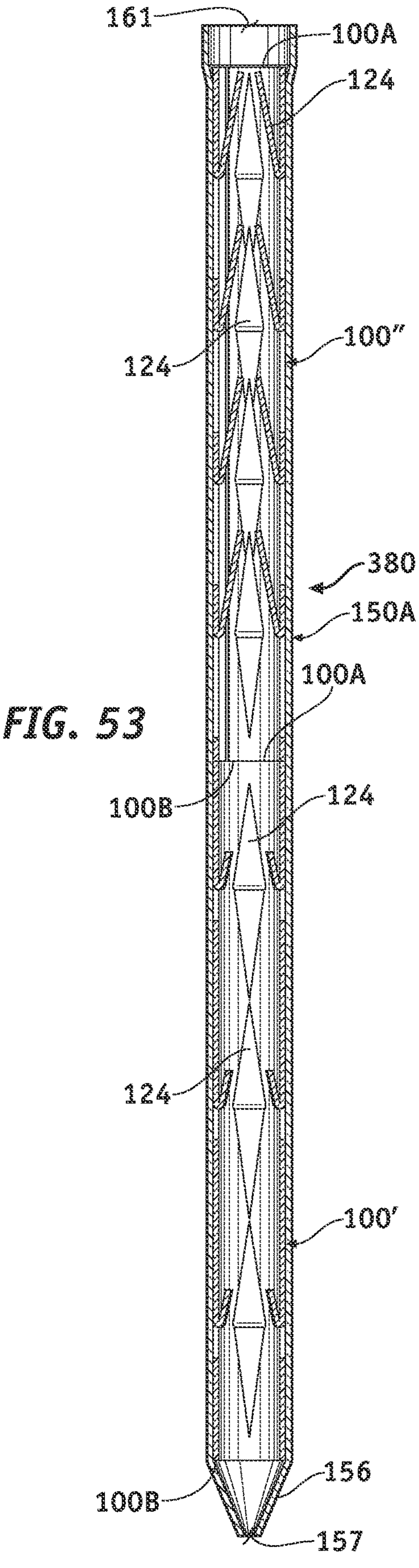
FIG. 53 is a vertical section view of an alternate embodiment of a static mixer according to the invention.

Referring briefly to FIG. 53, static mixer 380 includes housing 150A and two inserts 100' and 100". Housing 150A is identical to housing 150 structurally being different only in that it is comparatively longer to accommodate two inserts 150A that are each identical to insert 100. Accordingly, the reference characters used for insert 100 and housing 150 are also used where appropriate with inserts 100' and 100" and housing 150A.

In static mixer 380, insert 100' extends longitudinally through fluid flow path P from its discharge end 100B proximate and open to nozzle 156 and its outlet 157 to intake end 100A at an intermediate location between outlet 157 and inlet 161. Insert 100" extends longitudinally through fluid flow path P from its discharge end 100B proximate and open to intake end 100A of insert 100" to its intake end 100A at collar 167 proximate and open to inlet 161. Fluid streams, whether gas streams, liquid streams, liquid and gas streams, suitably pumped through fluid pathway P according to standard techniques from inlet 161 to outlet 157 enter fluid pathway P through inlet 161, enter insert 100" through its intake end 100A from inlet 161, encounter and are automatically and continuously mixed by deflectors 124 of insert 100" suitably positioned and oriented in fluid flow path P as they flow therethrough and through insert 100" from its intake end 100A to its discharge end 100B open to intake end 100A of insert 100'. The fluids enter insert 100' through its intake end 100A from discharge end 100B of insert 100", encounter and are automatically and continuously mixed by deflectors 124 of insert 100' suitably positioned and oriented in fluid flow path P as they flow therethrough and through insert 100' from its intake end 100A to its discharge end 100B open to nozzle 156 and outlet 157, enter nozzle 156 from discharge end 100B of insert 100', and exit suitably mixed through nozzle 156 outlet 157.

Figure 54:
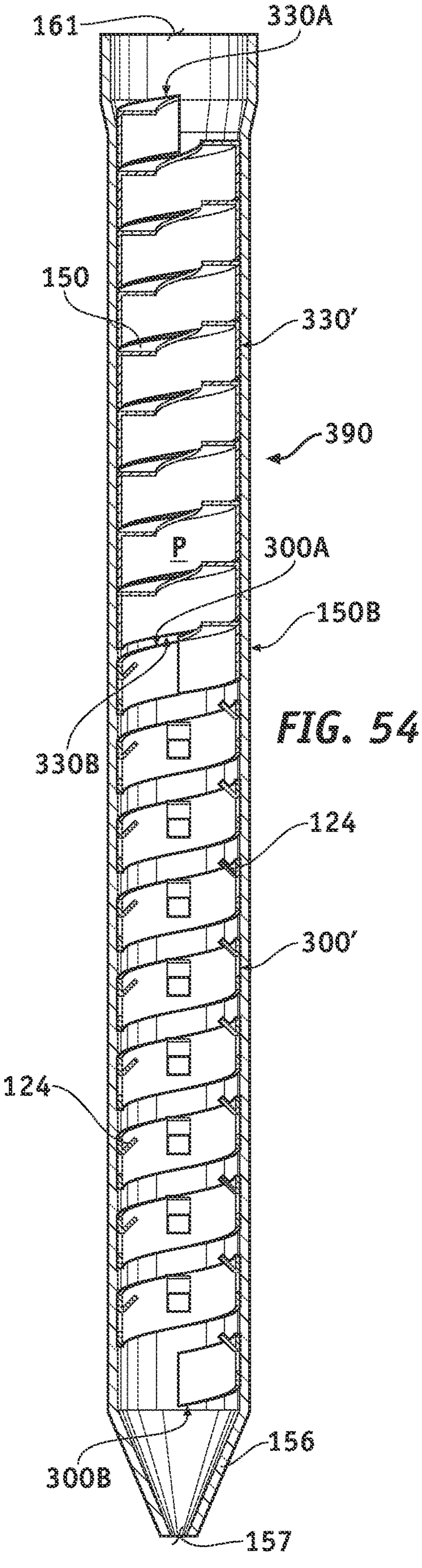
FIG. 54 is a vertical section view of yet another embodiment of a static mixer according to the invention.

Referring briefly to FIG. 54, static mixer 390 includes housing 150B and two inserts 300' and 330'. Housing 150B is identical to housing 150 structurally being different only in that it is comparatively longer to accommodate two inserts 300' and 330'. Inserts 300' and 330' are different from one another in this example, in which insert 300' is identical to insert 300 and insert 330' is identical to insert 330. Accordingly, the reference characters used for housing 150, insert 300, and insert 330 are also used where appropriate with housing 150B, insert 300', and insert 330', respectively.

In static mixer 390, insert 300' extends longitudinally through fluid flow path P from discharge end 300B proximate and open to nozzle 156 and its outlet 157 to intake end 300A at an intermediate location between outlet 157 and inlet 161. Insert 330' extends longitudinally through fluid flow path P from its discharge end 330B proximate and open to intake end 300A of insert 300' to its intake end 330A at collar 167 proximate and open to inlet 161. Fluid streams, whether gas streams, liquid streams, liquid and gas streams, suitably pumped through fluid pathway P according to standard techniques from inlet 161 to outlet 157 enter fluid pathway P through inlet 161, enter insert 330' through its intake end 330A from inlet 161, encounter and are automatically and continuously mixed by deflector 350 of insert 330' suitably positioned and oriented in fluid flow path P as they flow therethrough and through insert 330' from its intake end 330A to its discharge end 330B open to intake end 300A of insert 300'. The fluids enter insert 300' through its intake end 300A from discharge end 330B of insert 330, encounter and are automatically and continuously mixed by deflectors 124 of insert 300' suitably positioned and oriented in fluid flow path P as they flow therethrough and through insert 300' from its intake end 300A to its discharge end 300B open to nozzle 156 and outlet 157, enter nozzle 156 from discharge end 300B of insert 300, and exit suitably mixed through nozzle 156 outlet 157.

It is to be emphasized that a static mixer constructed and arranged according to the invention can incorporate any combination of two or more inserts, and that the inserts can be the same or different from one another depending on specific needs.

Figure 58:
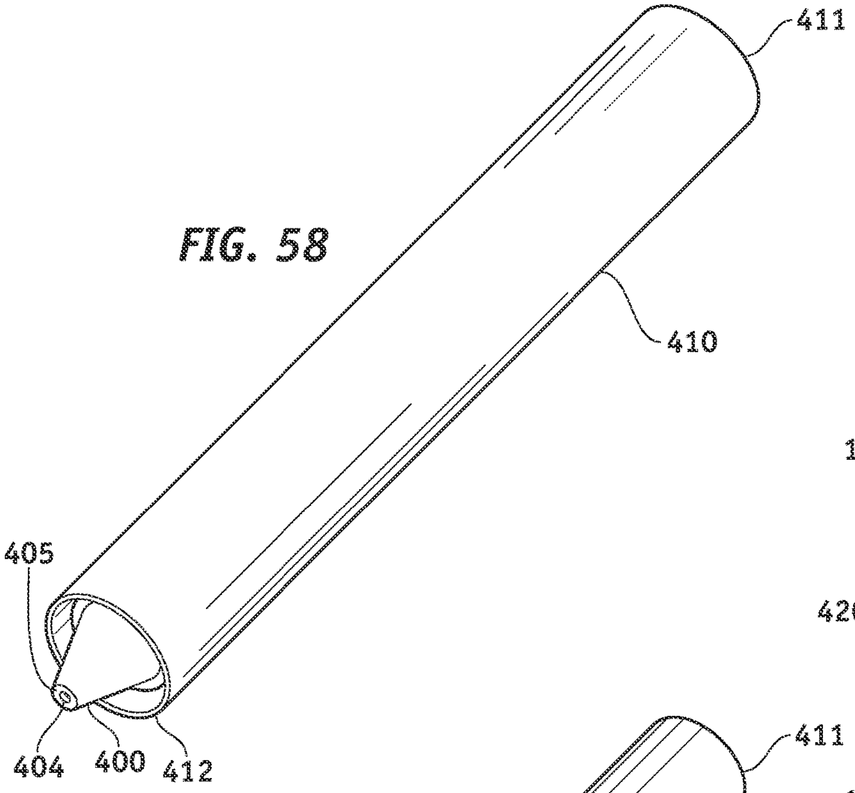
Figure 59:
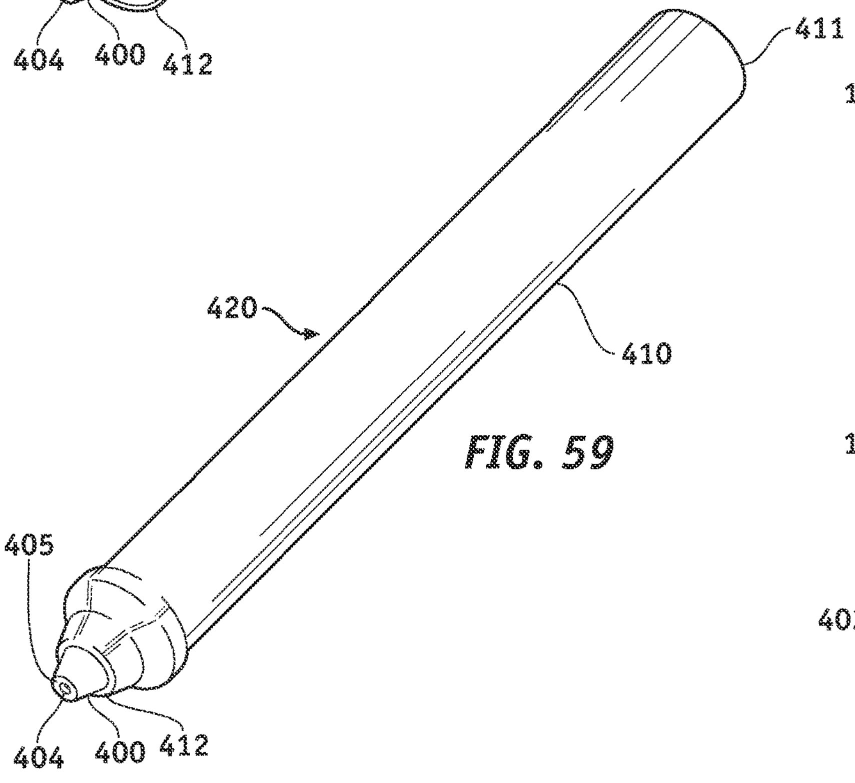
Figure 60:
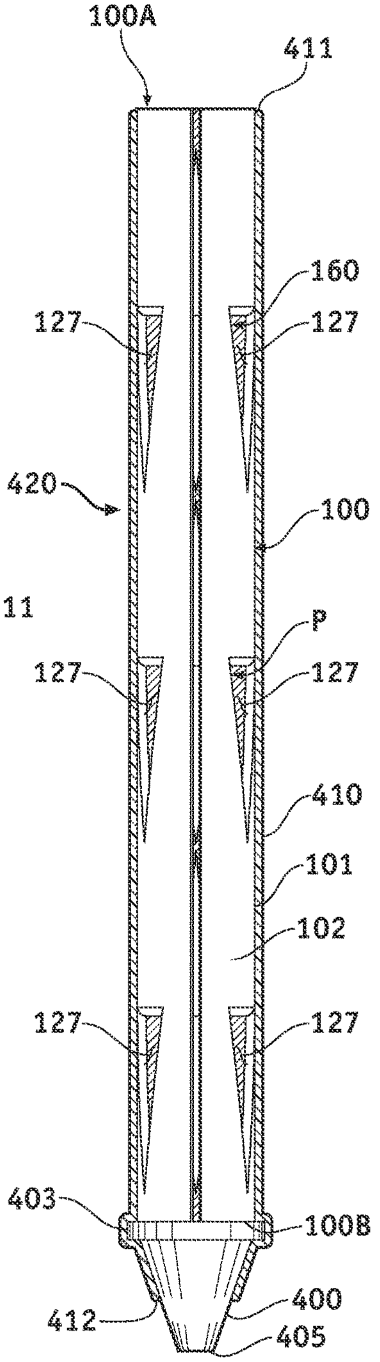
FIG. 60 is a side elevation view of the static mixer of FIG. 59, with portions thereof being broken away for illustrative purposes.

FIGS. 55-59 illustrate a sequence of steps of constructing a static mixer 420 in FIGS. 59 and 60 from insert 100, nozzle body 400, and heat-shrink tube 410 according to yet another embodiment of the invention. With additional reference to FIG. 57, nozzle body 400 includes an annular seat 401 encircling intake opening 402 at an intake end 403 and extends downwardly therefrom to an outlet 404 formed through an outlet end 405. Intake opening 402 and comparatively smaller outlet 404 are aligned axially at either end of nozzle body 400. Nozzle body 400 is frustoconical and can have other standard or chosen nozzle formats in alternate embodiments. Heat-shrink tube 410 is of standard construction ordinarily made of polyolefin, which shrinks radially but not longitudinally when heated to between one-half and one-sixth of its diameter. In FIG. 58, unshrunk tube 410 has a proximal end 411, a distal end 412, and a length from proximal end 411 to distal end 412.

Figures 55, 56, 57:
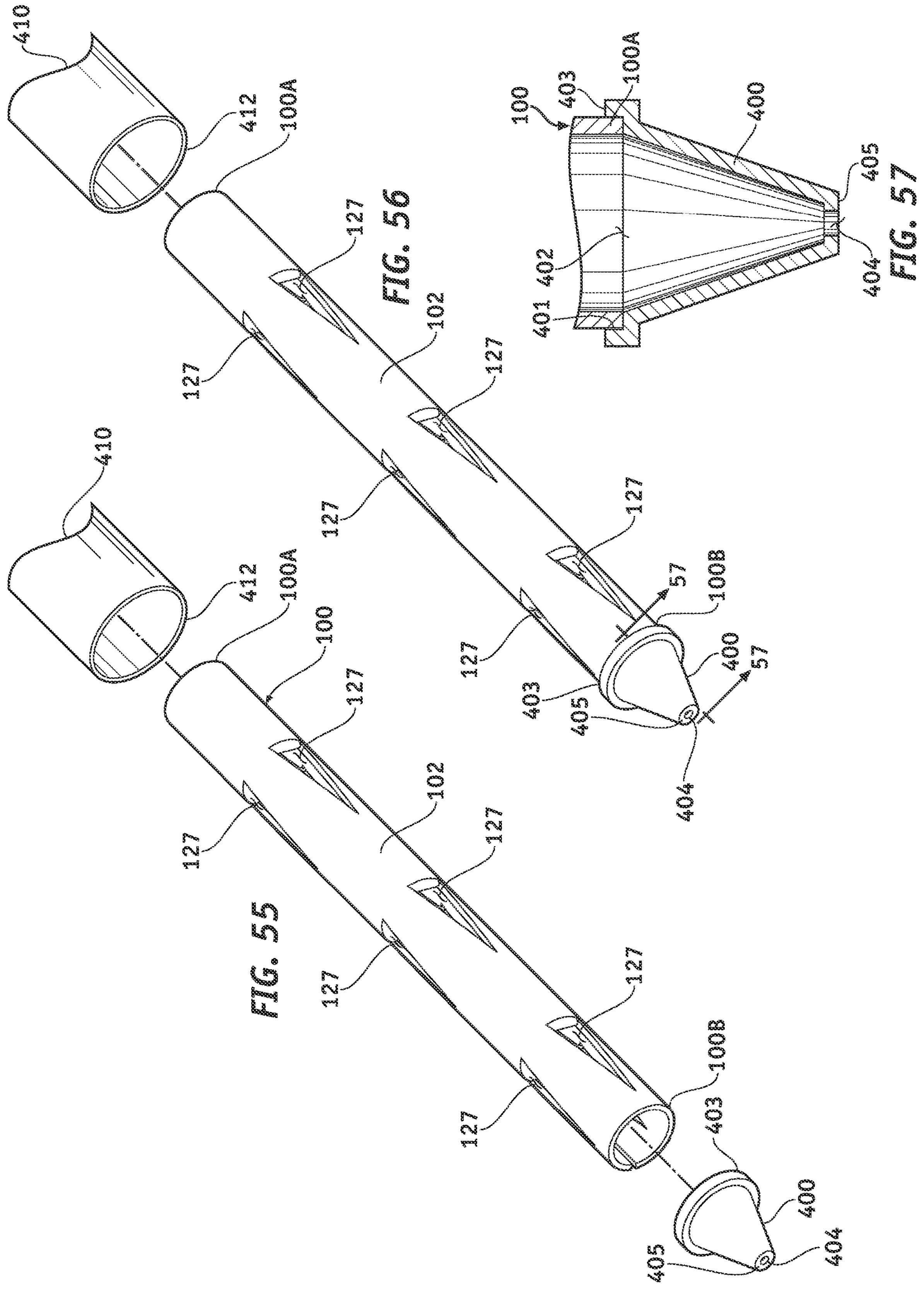
FIGS. 55-59 illustrate a sequence of steps of constructing a static mixer in FIG. 59 according to yet another embodiment of the invention.

Nozzle body 400 is fitted onto discharge end 100B of insert 100 in FIG. 56 simply by inserting discharge end 100B into annular seat 401 in FIG. 57, and unshrunk tube 410 is fitted over outer surface 102 insert 100 and nozzle body 400. Tube 410 is sufficiently long from proximal end 411 to distal end 412 to extend along over the length of insert 100 and nozzle body 410 from proximal end 411 at intake end 100A of insert 100 to distal end 412 at nozzle body 400. Unshrunk tube 410 is shrunk tightly around nozzle 400 and outer surface 102 of insert 100 in FIGS. 59 and 60 by the application of heat to form static mixer 420. FIG. 60 is a side elevation view of static mixer 420 with portions of shrunk tube 410 broken away illustrating insert 100 extending therethrough to nozzle body 400. When tube 410 is shrunk around insert 100 and nozzle body 400 in FIGS. 59 and 60, tube 410 is wrapped tightly around both securing them together, and extends over outer surface 102 of insert 100 along the length of insert 100 from proximal end 411 at intake end 100A to nozzle body 400 attached to discharge end 100B, closing openings 127 through annular sidewall 101, and beyond discharge end 100B over nozzle body 400 in FIG. 60 to distal end 412 at an intermediate position between intake end 403 and outlet end 405. With static mixer 420 so assembled, static mixer 420 being an exemplary housed static mixer, fluid streams, whether gas streams, liquid streams, liquid and gas streams, suitably pumped through fluid pathway P defined by volume 106 of insert 100 and nozzle body 400 according to standard techniques from intake end 100A to outlet 404 enter fluid pathway P through intake end 100A, encounter and are automatically and continuously mixed by its deflectors suitably positioned and oriented in fluid flow path P as they flow therethrough from intake end 100A to discharge end 100B open to intake opening 402 as shown in FIG. 57, enter nozzle body 400 through intake opening 402 as shown in FIG. 57 from discharge end 100B, and exit suitably mixed through nozzle body 400 outlet 404. To release insert 100 and nozzle body 400 from tube 410 for repair, adjustment, cleaning, replacement, or other servicing of either component, tube 410 is simply cut away. Insert 100 and nozzle body 400 may be reassembled into a static mixer simply by shrink wrapping them in a new shrink-wrap tube.

It is to be emphasized that that any insert and any combination of two or more inserts disclosed herein may be assembled with a nozzle by the application of a shrink-wrap tube to form a static mixer according to the invention, and that the inserts of a static mixer incorporating two or more inserts can be the same or different from one another.

While the various insert and static mixer embodiments are disclosed as having generally cylindrical cross-sectional shapes, they can have other cross-sectional shapes, such as oval, triangular, square, etc. Furthermore, the material of an insert constructed and arranged according to the invention can be fashioned with a component or combination of components designed to dissolve or otherwise mix into one or more fluid streams applied through a static mixer formed with such an insert. These one or more components can form the material of an insert, be coated onto an insert, impregnated into the material of an insert, etc. The deflectors of an insert constructed and arranged in accordance with the invention may also be configured to impart in fluid streams a desired turbulent flow mixing, laminar flow mixing, swirling mixing, etc. It is to be understood that a static mixer constructed in accordance with the invention is useful for laboratory applications, mixing two-component adhesives and sealants, wastewater treatment and chemical processing, bitumen processing, desalting crude oil, polymerization reactions, admixing of liquid additives, etc.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A static mixer for liquids or gases, comprising:

a housing arranged about a longitudinal axis and including a continuous inner surface defining a fluid flow path for liquids or gases, an inlet to the fluid flow path, and an outlet from the fluid flow path; and a helical member extending longitudinally through said fluid flow path and helically about the longitudinal axis between the inlet and the outlet, the helical member comprising an intake end open to the inlet, a discharge end open to the outlet, an outer surface between the intake end and the discharge end and facing the continuous inner surface, an inner surface between the intake end and the discharge end and facing the fluid flow path, deflectors each projecting inwardly into the fluid flow path from the inner surface of the helical member, the helical member elastically expansive, being tensioned outwardly toward the continuous inner surface exerting outwardly directed pressure by the outer surface directly against the continuous inner surface frictionally securing the outer surface to the continuous inner surface securing the helical member to the housing.

2. The static mixer according to claim 1, wherein each said deflector projects angularly upward toward the inlet.

3. The static mixer according to claim 1 wherein the helical member is formed unitarily with the deflectors.

4. The static mixer according to claim 3, wherein each said deflector is bent inwardly into the fluid flow path from an opening therefor through the helical member.

5. The static mixer according to claim 1, wherein the deflectors are spaced apart helically between the intake end and the discharge end of the helical member.

6. A static mixer for liquids or gases, comprising:

a housing arranged about a longitudinal axis and including a continuous inner surface defining a fluid flow path for liquids or gases, an inlet to the fluid flow path, and an outlet from the fluid flow path; and an insert comprising a helical member extending longitudinally through said fluid flow path and helically about the longitudinal axis between the inlet and the outlet, the helical member comprising an intake end open to the inlet, a discharge end open to the outlet, an outer surface between the intake end and the discharge end and facing the continuous inner surface, an inner surface between the intake end and the discharge end and facing the fluid flow path, and a helical deflector extending longitudinally through said fluid flow path between the intake end and the discharge end, inwardly into said fluid flow path from the inner surface of the helical member, and helically about the longitudinal axis, the helical member elastically expansive, being tensioned outwardly toward the continuous inner surface exerting outwardly directed pressure by the outer surface directly against the continuous inner surface frictionally securing the outer surface to the continuous inner surface securing the helical member to the housing.

7. The static mixer according to claim 6, further comprising openings through the helical deflector.

8. The static mixer according to claim 7, wherein the openings are spaced apart helically.

* * * * *